(12) United States Patent
Naito et al.

(10) Patent No.: US 7,306,751 B2
(45) Date of Patent: Dec. 11, 2007

(54) CRYSTALLINE SUPERFINE PARTICLES, COMPLEX MATERIAL, METHOD OF MANUFACTURING CRYSTALLINE SUPERFINE PARTICLES, INVERTED MICELLES, INVERTED MICELLES ENVELOPING PRECURSOR SUPERFINE PARTICLES, INVERTED MICELLES ENVELOPING CRYSTALLINE SUPERFINE PARTICLES, AND PRECURSOR SUPERFINE PARTICLES

(75) Inventors: Hiroki Naito, Kanagawa (JP); Yuichi Ishida, Kanagawa (JP); Masayuki Suzuki, Kanagawa (JP); Keiko Furukawa, Tokyo (JP); Katsuyuki Hironaka, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 11/490,069

(22) Filed: Jul. 21, 2006

(65) Prior Publication Data
US 2006/0257661 A1    Nov. 16, 2006

Related U.S. Application Data

(62) Division of application No. 10/694,042, filed on Oct. 28, 2003, now Pat. No. 7,160,614.

(30) Foreign Application Priority Data

Nov. 1, 2002   (JP)   .............................. 2002-319480
May 27, 2003   (JP)   .............................. 2003-149921

(51) Int. Cl.
   *C09K 11/64*    (2006.01)
   *C09K 11/55*    (2006.01)
(52) U.S. Cl. .............................. 252/301.4 R; 977/834; 977/811
(58) Field of Classification Search ......... 252/301.4 R, 252/301.6
See application file for complete search history.

(56) References Cited

U.S. PATENT DOCUMENTS

| 4,772,417 | A | 9/1988 | Pappalardo et al. |
| 5,279,868 | A | 1/1994 | Ohtsuka et al. |
| 5,442,254 | A | 8/1995 | Jaskie |
| 5,597,614 | A | 1/1997 | Noguchi et al. |

(Continued)

OTHER PUBLICATIONS

U.S. Appl. No. 11/588,383, filed Oct. 27, 2006, Naito et al.

*Primary Examiner*—C. Melissa Koslow
(74) *Attorney, Agent, or Firm*—Oblon, Spivak, McClelland, Maier & Neustadt, P.C.

(57) ABSTRACT

Crystalline superfine particles capable of emitting light depending upon a time-rate-of-change of a stress and controlled in grain size in the range from 5 nm to 100 nm are complexed with another material such as resin. The crystalline superfine particles are manufactured by using aggregates of molecules, i.e. inverted micelles, which orient hydrophilic groups of surfactant molecules inward and hydrophobic groups outward in a nonpolar solvent and which contain metal ions of a metal for forming the crystalline superfine particles dissolved in water inside the inverted micelles. Alternatively, they are manufactured by using inverted micelles enveloping precursor superfine particles, in which precursor superfine particles are enveloped in water inside the inverted micelles. The crystalline superfine particles are excellent in dispersibility in another material to be complexed, enhanced in emission efficiency and usable to make a transparent stress emission material. The complex material obtained is used to manufacture artificial light-emitting hair structures, artificial light-emitting skin, artificial light-emitting bodies, artificial light-emitting fabrics, and others.

8 Claims, 19 Drawing Sheets

U.S. PATENT DOCUMENTS

| | | | |
|---|---|---|---|
| 6,036,886 A * | 3/2000 | Chhabra et al. | 252/301.4 R |
| 6,159,394 A | 12/2000 | Akiyama et al. | |
| 6,280,655 B1 | 8/2001 | Xu et al. | |
| 6,423,247 B1 | 7/2002 | Fukushima et al. | |
| 6,514,617 B1 * | 2/2003 | Hubbard et al. | 428/412 |
| 6,572,784 B1 | 6/2003 | Coombs et al. | |
| 6,596,194 B1 | 7/2003 | Dobson et al. | |
| 6,628,375 B2 | 9/2003 | Xu et al. | |
| 6,783,699 B2 | 8/2004 | Li et al. | |
| 6,790,521 B1 | 9/2004 | Taketomi et al. | |
| 6,846,565 B2 | 1/2005 | Korgel et al. | |
| 6,918,946 B2 | 7/2005 | Korgel et al. | |
| 6,932,920 B2 | 8/2005 | Toyoda et al. | |
| 6,969,475 B2 | 11/2005 | Hyland et al. | |
| 6,982,046 B2 * | 1/2006 | Srivastava et al. | 252/301.4 R |

* cited by examiner

1

WATER

8

10

CRYSTALLINE SUPERFINE PARTICLES, COMPLEX MATERIAL, METHOD OF MANUFACTURING CRYSTALLINE SUPERFINE PARTICLES, INVERTED MICELLES, INVERTED MICELLES ENVELOPING PRECURSOR SUPERFINE PARTICLES, INVERTED MICELLES ENVELOPING CRYSTALLINE SUPERFINE PARTICLES, AND PRECURSOR SUPERFINE PARTICLES

This application is divisional application of U.S. application Ser. No. 10/694,042 (now U.S. Pat. No. 7,160,614), filed on Oct. 28, 2003, which claims priority to JP 2002-319480, filed on Nov. 1, 2002, and JP 2003-149921, filed on May 27, 2003.

BACKGROUND OF THE INVENTION

1. Field of the Invention

The present invention relates to crystalline superfine particles, complex material, method of manufacturing crystalline superfine particles, inverted micelles, inverted micelles enveloping precursor superfine particles, inverted micelles enveloping crystalline superfine particles and precursor superfine particles that are suitable for use in manufacture of a complex material used in, for example, the field of entertainment, the field of amusement or the field of optics.

2. Description of the Related Art

For years, aluminate compound materials doped with rare earth elements have been remarked as fluorescent materials, and have been under vigorous researches. Among various aluminate compound materials, Eu-doped $SrAl_2O_4$ (written as $SrAl_2O_4$:Eu herein below) has attracted the greatest attention as from a report on the phenomenon of stress emission as introduced later. Thus, prehistory of researches and developments of this $SrAl_2O_4$:Eu is first explained below while citing prior art documents.

History of Patents and Researches of $SrAl_2O_4$:Eu as Fluorescent Material $SrAl_2O_4$:Eu has the prehistory of having been studied as a fluorescent material from a long time ago. U.S. Pat. No. 3,294,699 on this material issued already in the 1960s, and the material is currently one of known materials.

History of Inventions and Researches of Phosphorescent Material/Long-Afterglow Phosphor $SrAl_2O_4$:Eu+Dy (Under the Brand of "LumiNova") by Nemoto & Co., Ltd.

There are many reports and commentaries on this phosphor, some of which are listed below.

Non-Patent Document 1: URL: http://www.nemoto.co.jp/index_j.html accessed through the Internet on Aug. 30, 2002

Non-Patent Document 2: URL: http://www.nemoto.co.jp/products/luminova/index.html accessed through the Internet on Aug. 30, 2002

Non-Patent Document 3: URL: http://www.nemoto.co.jp/product/01_luminova/index.html accessed through the Internet on Aug. 30, 2002

Non-Patent Document 4: URL: http://www.nemoto.co.jp/column/10_glow.html accessed through the Internet on Aug. 30, 2002

Patent Document 2: Specification of Japanese Patent No. 2543825

Patent Document 3: Specification of U.S. Pat. No. 5,424,006

Patent Document 4: Specification of European Patent No. 622440

Non-patent Document 5: T. Matsuzawa, N. Takeuchi, Y. Aoki and Y. Murakami, 248th Lecture Papers of Phosphor Research Society "Proc. Phosphor Res. Soc." (1993.11.26) 7-13

Non-patent Document 6: Yoshihiko Murakami, Nikkei Science, 5(1996) 20-29

Non-patent Document 7: T. Matsuzawa, Y. Aoki, T. Takeuchi and Y. Murayama, J. Electrochem. Soc., 143(1996) 2670-2673

Non-patent Document 8: Y. Murakami, Ceramics, 32(1997) 40-43

Non-patent Document 9: Y. Murakami, Hakaru, 42(1997) 2-7

Discovery of Stress Emission in $SrAl_2O_4$:Eu Compound Materials by C-N. Xu, et al. of National Institute of Advanced Industrial Science and Technology (AIST), Institute for Structural and Engineering Materials (ISEM), Multifunctional Materials Technology Group (Former, MITI Institute for Industrial Technology, Kyushu Institute for Industry and Technology, Laboratory for Inorganic Complex Materials and Functional Ceramics) as Well as History of Related Patents and Researches There are many commentaries and reports on the stress emission $SrAl_2O_4$:Eu compound materials and related substances, such as, for example, Non-patent Documents 10-17 and Patent Documents 5-19 that are listed below.

Non-patent Document 10: C-N. Xu, AIST Today, vol. 2, No. 8 (2002)

Non-patent Document 11: URL: http//www.aist.go.jp/aist_j/aistinfo/aist_today/vol02_0 8/vol02_80_main.html accessed through the Internet on Aug. 30, 2002

Non-patent Document 12: URL: http//www.aist.go.jp/aist_j/aistinfo/aist_today/vol02_0 8/vol02_08_p13.pdf accessed through the Internet on Aug. 30, 2002

Non-patent Document 13: C-N. Xu, T. Watanabe, M. Akiyama and X-G. Zheng, Appl. Phys. Lett., 74(1999) 1236-1238

Non-patent Document 14: C-N. Xu, T. Watanabe, M. Akiyama and X-G. Zheng, Appl. Phys. Lett., 74(1999) 2414-2416

Non-patent Document 15: C-N. Xu, X-G Zheng, M. Akiyama, K. Nonaka and T. Watanabe, Appl. Phys. Lett., 76(2000) 179-181

Non-patent Document 16: C-N. Xu, Kagaku Kogyo (October 2000) pp. 790-794 & 808

Non-patent Document 17: C-N. Xu, Gekkan Display, September (2001) 98-103

Patent Document 5: Japanese Laid-open Publication JP-H11-116946-A

Patent Document 6: Specification of Japanese Patent No. 3265356

Patent Document 7: Specification of Japanese Patent No. 3136340

Patent Document 8: Specification of Japanese Patent No. 3136338

Patent Document 9: Specification of Japanese Patent No. 2992631

Patent Document 10: Japanese Patent Laid-open Publication JP-2000-313878-A

Patent Document 11: Japanese Patent Laid-open Publication JP-2001-49251-A

Patent Document 12: Japanese Patent Laid-open Publication JP-2001-123162-A

Patent Document 13: Japanese Patent Laid-open Publication JP-2001-215157-A

Patent Document 14: Specification of Japanese Patent No. 3273317

Patent Document 15: Japanese Patent Laid-open Publication JP-2002-194349-A

Patent Document 16: Japanese Patent Laid-open Publication JP-2002-194350-A

Patent Document 17: Japanese Patent Laid-open Publication JP-2002-201068-A

Patent Document 18: Specification of U.S. Pat. No. 6,117,574

Patent Document 19: Specification of U.S. Pat. No. 6,159,394

Patent Document 5 discloses materials that contain 0.01-20 weight percent of rare earths or transition metals and emit light with external mechanical energy received by a wurtzite type piezoelectric material. Patent Document 6 discloses thin films of these materials. Patent Document 7 discloses materials that contain transition elements or rare earth elements having electron shells of 3d, 4d, 5d and 4f added to $MgAl_2O_4$, $CaAl_2O_4$, $Al_2O_3$ and $SrMgAl_{10}O_{17}$ as their matrices and emit light upon deformation with a mechanical external force, as well as a manufacturing method thereof. Patent Document 8 discloses materials that are made of substances containing transition elements or rare earth elements having electron shells of 3d, 4d, 5d and 4f as emission center ions and added to matrix crystals of metal oxides/complex oxides, and emit light by mechanical deformation. Patent Document 9 discloses materials containing transition elements or rare earths added to matrix materials of $Sr_3Al_2O_6$ and $Ga_3Al_2O_6$, as well as a manufacturing method thereof by baking under a controlled amount of the additive substance in 0.01-20 weight percent in a reducing atmosphere adjusted to 800~1700° C. Patent Document 10 discloses materials containing rare earths or transition metal elements as emission centers added to matrix materials of Y—Ba—Mg—Si oxides, which convert external mechanical energy to light. Document 11 describes materials that contain regulated aluminate having a non-stoichiometrical composition and emit light under mechanical energy. Document 12 describes $mMO \cdot nAl_2O_3$ materials as phosphorus memory excited by visible light. Patent Document 13 discloses a system for measuring the stress profile by using a stress emission material. Patent Document 14 discloses materials that contain oxides having a melilite type crystal structure (such as $CaYAl_3O_7$, $Ca_2Al_2SiO_7$ or the like) as their matrices and emit light under mechanical energy. Patent Document 15 discloses materials $MN_2O_4$, where M=Mg, Sr, Ba or Zn, N=Ga or Al, doped with rare earths or transition metals as their emission centers, together with a manufacturing method thereof. Patent Document 16 describes field emission materials composed of aluminate as their matrices and doped rare earths or transition elements. Patent Document 17 discloses electrostriction materials of (Sr, Ba, Mg, Ca, Zn, Cd)—(Al, Ga, Si) oxides having the maximum distortion of 1%. This is a considerably large value. Patent Document 18 discloses piezoelectric materials as triboluminescent materials. Document 19 mainly describes $Sr_3Al_3O_6$ as stress emission materials, and this document corresponds to Patent Document 9.

Next explained are prior art technologies for complexing stress emission substances, mainly $SrAl_2O_4$-based fine particles, with resins.

Products incorporating complex materials commercially named "LumiNova" ($SrAl_2O_4$:Eu+Dy) into resins are on sale in form of "incorporated resin pellets" from Nemoto & Co., Ltd. They are introduced in the web sites, URL:

http://www.nemoto.co.jp/products/luminova/index.html accessed through the Internet on Aug. 30, 2002 and herein taken as Non-patent Document 18, and URL: http://www.nemoto.co.jp/products/gss/index.html accessed through the Internet on Aug. 30, 2002 and herein taken as Non-patent Document 19.

The above web documents and Non-patent Document 9 disclose polymethylmethacrylate (PMMA), ABS resins, polycarbonate (PC), polystyrene (PS), Polyethylene (PE), polypropylene (PP), polyacetals (PA) and urethane resins as resin materials. Further, according to the web documents, there seems to be a trial of incorporation into silicone rubber. However, no details are disclosed. About mixture ratios of powder and resins, a ratio around 10% in weight percent is the sole suggestion.

On the other hand, most of complex materials reported in research papers of the discoverer of stress emission, Xu, and others, are mixtures of powder into epoxy resins as matrices, and they are in form of bulk aggregates. Therefore, strong mechanical force from a vise, for example, is required to induce their emission of light.

In Non-patent Document 10, Xu describes application of his complex materials mainly to technologies for visualizing stress profiles and various types of displays. However, he describes or suggests nothing about development of their applications to artificial light-emitting skins, artificial light-emitting hair, artificial light-emitting bodies, artificial light-emitting cloth, and like others, for the purpose of entertainment. Additionally, in relation to complexing techniques, the sole statement is found in a research paper about epoxy resin molding. Complexing with other resins is not found at all in the web documents either.

Some products as applications of phosphorescent materials developed by Nemoto & Co., Ltd. are distributed from Tokyo Intelligent Network Kabushiki Kaisha (Non-patent Document 20: URL: http://www2.raidway.ne.jp/~tin/ accessed through the Internet on Aug. 30, 2002, and Non-patent Document 21: URL: http://www2.raidway.ne.jp/~tin/nl/nl.html accessed through the Internet on Aug. 30, 2002), and products from San Unit Company (Non-patent Document 22: URL: http://web.kyoto-inet.or.jp/people/sansanuc/s4/html accessed through the Internet on Aug. 30, 2002). Products of Non-patent Documents 20, 21 are applications to phosphorescent tiles, phosphorescent straps, phosphorescent special make gels, phosphorescent wallpaper, and so on, as applications of phosphorescent materials. Products of Non-patent Document 22 are applications of phosphorescent materials to tiles, paints, pellets, balls, and so on. However, there is no disclosure or suggestion on developments of applications to artificial light-emitting skins, artificial light-emitting hair, artificial light-emitting bodies, artificial light-emitting cloth, and like others, for the purpose of entertainment.

There are documents concerning transparent phosphorescent materials although none of them discuss stress emission. Patent Document 20 (JP-H06-43580-B) discloses highly transparent fluorescent films extremely reduced in voids in the fluorescent films. Patent Document 21 (JP-H07-195890-A) describes fluorescent writing/drawing instruments containing transparent fluorescent inks and having ultraviolet lamps, and explains that images drawn with the instruments can be changed visible and invisible repeatedly. Patent Document 22 (JP-H09-95671-A) describes that transparent phosphorescent materials are obtained by using ultrafine particles of a grain size not reflecting visible light (1 to 100 nm) as the phosphorescent phosphors and complexing them with transparent binders, and this document discloses $SrAl_2O_4$:Eu phosphorescent phosphors as their embodiments. Patent Document 23 (JP-H06-227192-A) discloses commuter tickets using transparent phosphorescent inks or transparent infrared absorption inks and effective for preventing falsification. Patent Document 24 (JP-H09-183288-A) discloses a sheet having secret information of characters or others written by transparent ink to prevent falsification. These documents relate to materials essentially different in function from stress emission materials.

There is a proposal of a method for synthesizing ultrafine particles by using inverted micelles (Non-patent Document 23: T. Kawai, Shokuzai, 71(1993) 449).

Furthermore, it has been reported that ultrafine particles can be aligned in order by using exchange reaction of ligands on surfaces of ultrafine particles (Non-patent Document 24: T. Torimoto and F. Ohtani, Electrochemistry, 69(2001) 866). As an example of surface modification by ligand exchange of organic molecules covering precursor ultrafine particles with desired organic molecules, it has been proposed to coat the surfaces with molecules such as polyoxyethylene (1) lauryl ether phosphoric acid or polyoxyetylene (4, 5) lauryl ether (Patent Document 25: Japanese Patent Laid-open Publication JP-2002-20471-A).

In any of the above-introduced prior art techniques, stress emission particles are prepared by crushing ceramics prepared by solid phase reaction into powder.

Therefore, it was difficult to obtain stress emission particles of a uniform grain size, and the grain size was as large as several μm. Accordingly, it has been difficult to obtain complex materials in which stress emission particles are uniformly dispersed. Moreover, it was difficult to apply stress emission particles to devices having micro-sized structures. For example, in case of preparing stress emission artificial hair by packing stress emission particles in transparent tubes, a limit of downsizing the diameter of the tubes will make it difficult to obtain sufficiently thin stress emission artificial hair.

Furthermore, since stress emission particles having a grain size as large as several μm scatter and reflect light in the range of visible light (wavelengths from 400 to 750 nm), it was impossible to prepare transparent stress emission materials from those stress emission particles. Therefore, the conventional stress emission particles are not suitable for use in portions such as a display panel required to be transparent, with which it is necessary to confirm information on one surface of the panel from the opposite surface through the panel.

OBJECTS AND SUMMARY OF THE INVENTION

The present invention intends to overcome the above-mentioned problems.

That is, an object of the invention is to provide crystalline superfine particles as stress emission articles that are excellent in dispersibility when complexed with other materials, enhanced in emission efficiency, and suitable for preparing transparent stress emission materials.

A further object of the invention is to provide a manufacturing method suitable for manufacturing such crystalline ultrafine particles, inverted micelles, inverted micelles enveloping precursor superfine particles, inverted micelles enveloping crystalline superfine particles, precursor superfine particles, and complex material containing them.

A still further object of the invention is to provide a complex material from which a hand or finger touch of a person can induce emission of light and which is allowed to emit light only when a stress is applied by a hand touch, for example.

Through vigorous studies toward solution of the aforementioned problems involved in the prior art techniques, the Inventors have found that a stress emission material remarkably excellent in dispersibility can be obtained if a complex material is made by using crystalline superfine particles prepared by an inverted micelle method to have a grain size from 5 nm to 100 nm, precursor superfine particles prepared by the inverted micelle method, or the like, and have reached the present invention.

That is, according to the first aspect of the invention, there is provided a crystalline superfine particle characterized in having a grain size in the range from 5 nm to 100 nm and emitting light depending upon the time-rate-of-change of a stress applied thereto.

The reason why the grain size of the crystalline superfine particles is limited to from 5 nm to 100 nm (including the critical values in all numerical expressions using "from" and "to" herein). In order to permit visible light in the wavelength range from 380 nm to 780 nm to pass without scattering or reflection, the grain size is preferably below 100 nm. On the other hand, the stress emission material is typically made by addition of a very small amount of emission center elements to the matrix material. Therefore, if the grain size is smaller than 5 nm, it is difficult to manufacture the crystalline ultrafine particles because crystalline superfine grains failing to include emission center elements and hence low in emission intensity appear with a high probability. In addition, crystalline superfine particles of a grain size below 5 nm will be difficult to handle. The grain size of the crystalline superfine particles may be determined in the range from 5 nm to 100 nm. However, its typical range is from 5 nm to 80 nm, and its more typical range is from 20 nm to 80 nm. In addition, when complexed with other materials, the crystalline superfine particles are used in form of powder (a mass of particles). The crystalline superfine particles forming the powder preferably have a mean grain size from 5 nm to 100 nm. In this case, the standard deviation of the grain size distribution is preferably limited within ±30%, more preferably within ±20%, still more preferably within ±10%, and most preferably within ±5%.

The crystalline superfine grains may have any shapes such as spherical, cubic, rectangular, flat or rod-like shapes. Usually, however, spherical particles are used. In case of flat and rod-shaped crystalline superfine particles, their grain size pertains to their lengthwise size.

To induce emission of light depending upon the time-rate-of-change of a stress, an external energy is applied to the crystalline superfine particles. This energy is typically a mechanical energy by a stress generated by an external force. Otherwise, vibration energies by elastic vibrations or acoustic waves such as ultrasonic waves applied from outside are also contemplated herein.

Surfaces of the crystalline superfine particles may be covered by organic molecules, for example. Various kinds of organic molecules are acceptable for this purpose. However, in case the crystalline superfine particles are manufacture by the inverted micelle method as explained later, the organic molecules are a surface-active agent having hydrophilic groups and hydrophobic groups. The hydrophilic groups are —$SO_3^-$, $R_2N^+R_2$ (R is an alkyl group), —OH, —$(OCH_2CH_2)_n$—, —O— or —N=, or the like, and the hydrophobic groups are in form of normal chains or alkyl chains having branches, for example.

A typical stress emission material used for preparing the crystalline ultrafine particles is an inorganic compound. Various kinds of inorganic compounds are usable for this purpose, and one or more kinds of such inorganic compounds may be used, depending upon the intended use. Typically, such inorganic compounds are oxides, sulfides, nitrides and carbides. More specifically, they are wurtzite type piezoelectric materials such as ZnS:Mn, ZnS:Cu, ZnS:Eu, ZnS:Ce, AlN:Mn, SiC:Mn, ZnO:Eu and ZnO:Mn; $ZrO_2$:Ce, $ZrO_2$:Ti and $HfO_2$:Ce, CeO:Ce having a fluorite structure; $Cr_2O_3$:Ce, $Ti_2O_3$:Ce and $Al_2O_3$:Ce having corundum type structures; aluminates such as $Sr_3Al_2O_6$:Eu, $Ca_3Al_2O_6$:Nd, $MgAl_2O_4$:Ce, Eu, Mn, Cu, Eu+Tb, $SrAl_2O_4$, $SrAl_2O_4$:Eu, $BaAl_2O_4$:Eu, $CaAl_2O_4$:Ce, $SrMgAl_{10}O_{17}$:Eu, Sr—Ba—Mg—Al—O:Eu, Ba—Mg—Al—O:Eu, Y—Ba—Mg—Si—O-based $Y_2SiO_5$:Eu, Ce, Sm, $BaSi_2O_5$:Pb and $Ba_3MgSi_2O_8$:Eu; $Ca_2Al_2SiO_7$:Ce, $CaMgSi_2O_7$:Ce, $Ca_2$(Mg, Fe)$Si_2O_7$:Ce, $CaYAl_3O_7$:Ce, $Ca_2B_2SiO_7$:Ce, $CaNaAlSi_2O_7$:Ce, (Ca, Na)$_2$(Al, Mg)(Si, Al)$_2O_7$:Ce and $Ca_2$(Mg, Al)(Al, Si)$SiO_7$:Ce having melilite structures; spinel type $ZnGa_2O_4$:Mn, $ZnAl_2O_4$:Mn and $MgGa_2O_4$:Mn; and their derivative inorganic components.

Especially when the crystalline superfine particles are composed of alkaline earth aluminate, they are an oxide crystal having the composition expressed by the following general formula,

$$A_xB_yO_x$$

where $0.8 \leq x \leq 1.1$
$1.8 \leq y \leq 2.2$
$\{(2x+3y)/2\}-0.2<z<\{(2x+3y)/2\}+0.2$
$A=Sr_kBa_lCa_mMg_n$
($0 \leq k, l, m, n \leq 1$, $k+l+m+n=1$)
$B=Al_{1-p}D_p$ ($0 \leq p<1$)
$D=Y_qGa_rIn_t$ ($0 \leq q, r, t \leq 1$, $q+r+t=1$)

The term A in the general formula $A_xB_yO_z$ is expressed as $Sr_kBa_lCa_mMg_n$. This means that it is a solid solution containing alkaline earths Sr, Ba, Ca, Mg in any arbitrary composition. D is expressed as $Y_qGa_rIn_t$, and this means that it is a solid solution containing any arbitrary composition of Y, Ga and In. Typically, however, it is a solid solution containing Al as its major component and additionally containing Y, Ga and In. In some cases, rare earth elements or transition metal elements are added to the crystalline superfine particles. In such cases, rare earth elements or transition metal elements are typically added by not more than 0.2 mol in total relative to 1 mol of $A_xB_yO_z$. Typically, at least Eu is added as the rare earth element or the transition metal element. In case rare earth elements or transition metal elements are added, they are typically introduced to replace the A site of the oxide crystal to form a solid solution.

A plurality of stress emission materials different in emission color and exhibiting emission of desired colors may be selected and combined to form a material that emits light of different colors. For example, from the viewpoint of emission intensity, aluminate materials are preferable. Among them, $SrAl_2O_4$:Eu emitting green light most visible for human eyes is especially suitable.

Alternatively, new materials found by the Inventors may be used as the stress emission material.

More specifically, the Inventors have found new materials different from known materials such as the stress emission material prepared by adding only europium (Eu) to aluminate and the stress emission material prepared by adding Eu and dysprosium (Dy) ($SrAl_2O_4$:Eu, Dy). Unlike the stress emission material made by adding Eu to aluminate, these new materials are prepared by lanthanum (La), cerium (Ce), erbium (Er), thulium (Tm), gadolinium (Gd) lutetium (Lu) or ytterbium (Yb) as the second additive element. Among these new materials, those containing La, Ce, Er or Tm in addition to Eu ensure very intensive emission as compared with those known stress emission materials. Especially, the novel stress emission material containing La in addition to Eu ensures remarkably high emission intensity.

Those stress emission materials can be summarized as follows.

The first stress materials are characterized in having the composition expressed by:

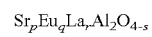
$$Sr_pEu_qLa_rAl_2O_{4-s}$$

where $p+q+r=1$
$0.8<p<1$
$0<q<0.2$
$0<r<0.2$ and
$-0.1<s<0.2$

The second stress emission materials are characterized in containing at least Eu and La added to a material expressed by:

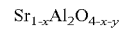
$$Sr_{1-x}Al_2O_{4-x-y}$$

where $-0.3<x<0.3$ and
$0 \leq y<0.2$

The total amount of Eu and La added in the stress emission material is typically from 0.002% to 30% in mol % relative to Sr. Alternatively, each of Eu and La is added in the stress emission material typically by an amount from 0.001% to 20% in mol % relative to Sr.

The third stress emission materials are characterized in containing at least Eu and any of Ce, Er, La and Tm added to a material expressed by:

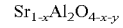
$$Sr_{1-x}Al_2O_{4-x-y}$$

where $-0.3<x<0.3$ and
$0 \leq y<0.2$

The total amount of Eu and any of Ce, Er, La and Tm added in the stress emission material is typically from 0.002% to 30% in mol % relative to Sr. Alternatively, the amount of Eu and the amount of Ce, Er, La or Tm added in the stress emission material are each typically from 0.001% to 20% in mol % relative to Sr.

The fourth stress emission materials are characterized in containing at least Eu and any of Ce, Er, La, Tm, Gd, Lu and Yb added to a material expressed by:

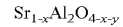
$$Sr_{1-x}Al_2O_{4-x-y}$$

where $-0.3<x<0.3$ and
$0 \leq y<0.2$

The total amount of Eu and any of Ce, Er, La, Tm, Gd, Lu and Yb added in the stress emission material is typically from 0.002% to 30% in mol % relative to Sr. Alternatively, the amount of Eu and the amount of Ce, Er, La, Tm, Gd, Lu or Yb added in the stress emission material are each typically from 0.001% to 20% in mol % relative to Sr.

The fifth stress emission materials are characterized in containing at least Eu and La added to a material expressed by:

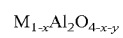
$$M_{1-x}Al_2O_{4-x-y}$$

where −0.3<x<0.3
  0≦y<0.2 and
  M=$Sr_k Ba_l Ca_m Mg_n$
  (0≦k, l, m, n≦1, k+l+m+n=1)

The total amount of Eu and La added in the stress emission material is typically from 0.002% to 30% in mol % relative to M. Alternatively, the amount of Eu and the amount of La added in the stress emission material are each typically from 0.001% to 20% in mol % relative to M.

The sixth stress emission materials are characterized in containing at least Eu and any of Ce, Er, La and Tm added to a material expressed by:

$$M_{1-x}Al_2O_{4-x-y}$$

where −0.3<x<0.3
  0≦y<0.2 and
  M=$Sr_k Ba_l Ca_m Mg_n$
  (0≦k, l, m, n≦1, k+l+m+n=1)

The total amount of Eu and any of Ce, Er, La and Tm added in the stress emission material is typically from 0.002% to 30% in mol % relative to Sr. Alternatively, the amount of Eu and the amount of Ce, Er, La or Tm added in the stress emission material are each typically from 0.001% to 20% in mol % relative to M.

The seventh stress emission materials are characterized in containing at least Eu and any of Ce, Er, La, Tm, Gd, Lu and Yb added to a material expressed by:

$$M_{1-x}Al_2O_{4-x-y}$$

where −0.3<x<0.3
  0≦y<0.2 and
  M=$Sr_k Ba_l Ca_m Mg_n$
  (0≦k, l, m, n≦1, k+l+m+n=1)

The total amount of Eu and any of Ce, Er, La, Tm, Gd, Lu and Yb added in the stress emission material is typically from 0.002% to 30% in mol % relative to Sr. Alternatively, the amount of Eu and the amount of Ce, Er, La, Tm, Gd, Lu or Yb added in the stress emission material are each typically from 0.001% to 20% in mol % relative to M.

In the fifth to seventh stress emission materials, M in $M_{1-x}Al_2O_{4-x-y}$ is expressed as $Sr_k Ba_l Ca_m Mg_n$. This means that it is a solid solution containing alkaline earths Sr, Ba, Ca and Mg in any composition.

The second to seventh stress emission materials contain Eu and any of Ce, Er, La, Tm, Gd, Lu and Yb added to a material expressed by $Sr_{1-x}Al_2O_{4-x-y}$ or $M_{1-x}Al_2O_{4-x-y}$. However, stress emission materials will be obtained as well by adding other rare earth elements instead of Ce, Er, La, Tm, Gd, Lu or Yb, such as scandium (Sc), yttrium (Y), praseodymium (Pr), neodymium (Nd), promethium (Pm), samarium (Sm), terbium (Tb) or holmium (Ho). All of the second to seventh stress emission materials contain Eu as an additive element. However, containment of Eu is not considered the absolute requirement. Instead, stress emission materials will be obtained by adding two different kinds of rare earth elements not including Eu. Furthermore, stress emission materials will be obtained as well by adding at least one kind of rare earth element and at least one kind of transition metal element.

Basically, any method is acceptable for manufacturing the crystalline ultrafine particles. However, the inverted micelle method is preferably used as explained later.

The features of the first aspect of the invention summarized above are applicable to the second to thirteenth aspects of the invention as well, as far as they are congruous to their natures.

According to the second aspect of the invention, there is provided a complex material composed of crystalline superfine particles having a grain size in the range from 5 nm to 100 nm and another material, and emitting light depending upon the time-rate-of-change of a stress applied thereto.

The material to be complexed with the crystalline superfine particles may be selected from various kinds of materials, depending upon the intended use. The material may be only one kind or a combination of two or more kinds of different materials. Alternatively, it may be one or both of an organic material or an inorganic material. In some cases, the material may be an organic/inorganic complexed substance. For example, this material may be one of various kinds of resins and glass. If the complex material should be flexible, an elastic material is selected from those materials. In this case, weight percentage of the crystalline superfine particles in the complex material may be determined adequately depending upon the intended use of the complex material. However, if an elastic material is used as the material to be complexed with the crystalline superfine particles, the weight percent is preferably controlled in the range from 30% and to less than 100%, or more preferably from 30% to 80%, from the standpoint of keeping the entirety of the complex material flexible to facilitate stress emission with human force and improve the durability. Those materials may have any Young's modulus as far as human force, for example, can readily induce emission of light. Young's modulus of a relatively hard material will be, for example, 10 MPa or more, and that of a softer material is preferably smaller than 10 MPa, or preferably not larger than 1 MPa, for example. Usually, it is 0.0001 MPa or more. Similarly, Young's modulus of the complex material is 10 MPa or more, for example. Young's modulus of a softer complex material is, for example, smaller than 10 MPa, or typically not larger than 1 MPa, for example. Usually, it is 0.0001 MPa or more.

In the complex material, the crystalline superfine particles disperse without contacting with each other. On the other hand, during the manufacture of the complex material, such as during mixture, the crystalline ultrafine particles sometimes aggregate undesirably for some reason. Even in such a case, if the size of the aggregation does not exceed 100 nm, for example, scattering and reflection of visible light can be prevented.

A typical material complexed with the crystalline ultrafine particles is an organic substance. For example, it is at least one kind of substances selected from the group consisting of Its examples are acrylic resin, methacrylic resin, polymethyl methacrylate, ABS resin, polycarbonate, polystyrene, polyethylene, polypropylene, polyacetal, urethane resin, polyester, epoxy resin, silicone rubber, organic silicon compounds having siloxane bonds and organic piezoelectric substances. Examples of organic piezoelectric substances are polyvinylidene fluoride (PVDF) and polytrifluoroethylene copolymers. In addition to them, foaming substances such as expanded polystyrene, polyethylene foam and their mixture are usable, and they are especially suitable for obtaining a soft complex material excellent in elasticity.

In case an external force is applied to a complex material made by complexing the crystalline ultrafine particles with a resin such as polymethyl methacrylate, ABS resin, polycarbonate, polystyrene, polyethylene, polypropylene, polyacetal, urethane resin, polyester, epoxy resin, silicone rubber, organic silicon compounds having siloxane bonds or organic piezoelectric substances that are mentioned above, the complex material elastically yields without losing the original property of the resin. Accordingly, a stress is generated in the dispersed crystalline ultrafine particles, and emission of light from the crystalline ultrafine particles can be confirmed. In this case, a force of a light hand touch of a person is sufficient as the external force deform the complex material and give rise to stress emission thereof.

When preparing the complex material combining the crystalline superfine particles and a resin, a photo-curing resin may be selected as the resin. Thus, a structure having a complicate conformation can be made by making use of a three-dimensional optical molding method. This photo-curing resin is mainly composed of a pre-polymer, monomer and initiator. For example, epoxy-based, acrylic, en-thiol-based resins are usable as the photo-curing resin.

Alternatively, the material to be complexed with the crystalline ultrafine particles may be an electrically conductive organic substance that deforms by acquiring ions, for example. Examples of such electrically conductive organic substances are electrically conductive polymers of complex aromatic rings such as polypyrole, polythiophene, and polyanilin. Polymeric gel materials are also usable as the material to be complexed with the crystalline ultrafine particles. When a polymeric gel material is used, it may be at least one kind of materials selected from the group consisting of water-soluble non-electrolytic polymeric gel having a thermal displacement function, electrolytic polymeric gel giving rise to displacement by pH, combination of a polymeric compound giving rise to displacement by electricity and a surface-active agent, polyvinyl alcohol-based material and polypyrrolic material. The water-soluble non-electrolytic polymeric gel displaceable with heat may be, for example, polyvinyl methyl ether or poly-N-isopropyl acrylamide. The electrolytic polymeric gel displaceable with pH may be, for example, polyacrylonitrile. The polymeric compound displaceable with electricity may be, for example, polyacrylamide-2-methylpropane sulforic acid.

In case an inorganic substance is used as the material to be complexed with the crystalline superfine particles in the complex material, a typical inorganic substance is inorganic glass. In general, this glass contains at least one kind of element selected from the group consisting of Si, Ge, Ti, Zr, Pb, B, Al, P, As, Mg, Ca, Sr, Ba, Li, Na, K, S, Se, Te and F. More specifically, it is composed of at least one kind of substance selected from an oxide containing Si, Al, Ti or B, silica glass, borosilicate glass, boric acid glass, soda glass and aluminate-based glass. These kinds of glass have higher Young's moduli than resins. So much, however, they are advantageous inducing a stress in the crystalline superfine particles more effectively.

In case the complex material is a liquid paint, ink, adhesive, or the like, a binder, additive, solvent, or the like, is typically used as another materials to be complexed with the crystalline superfine particles. An inorganic resin (such as polysiloxane or polyborosiloxane), metallic alcoxide (such as organic silicate or organic titanate), both as a binder; viscosity improver, anti-sedimentation agent or hardener, all as an additive; organic solvent or water, both as a solvent; is selected adequately where necessary.

In case the crystalline ultrafine particles are complexed with another material, the material is preferably transparent to visible light not to reduce the emission luminance. The above-mentioned resins such as epoxy resin, acrylic resin and silicone rubber, and borosilicate glass, are favorable examples for this purpose. As such, by using a transparent material to visible light as the material to be complexed with the crystalline superfine particles, it is ensured that the crystalline superfine particles having the above-mentioned grain size from 5 nm to 100 nm transmit visible light without scattering or reflecting it, and at the same time, it is possible to obtain a complex material that allows transparent to visible light. Therefore, in case a sheet, film or artificial light-emitting hair explained later, is made of the transparent complex material, they are normally transparent, and emission of light can be brought about from the crystalline ultrafine particles dispersed in their complex materials only when stressed by a hand touch or a bending force, for example. Moreover, although a transparent stress emission paint or transparent stress emission ink made by dispersing the crystalline ultrafine particles in a binder, or the like, are normally transparent and invisible, they emit light from their coated area only when stressed by a hand touch, for example.

Specific examples of the complex material are: a combination of crystalline superfine particles made of $SrAl_2O_4$ or $BaAl_2O_4$ as the matrix substance and 0.001% to 20% of Eu added to the matrix substance, and an organic substance as the other material comprising polyester, acrylic resin, methacryl resin or their mixture; a combination of crystalline ultrafine particles made of $SrAl_2O_4$ or $BaAl_2O_4$ as the matrix substance and 0.001% to 20% of Eu added to the matrix substance, and an inorganic material as the other material comprising inorganic glass.

A complex material remarkably excellent in dispersibility can be made by selecting appropriate materials taking account of affinity between ligands on surfaces of ultrafine particles and the material to be complexed, as explained later, when complexing the crystalline ultrafine particles and the other material. Therefore, this is preferably taken into consideration when selecting materials. It is also possible to arrange superfine particles in order by using exchange reaction of ligands on surfaces of the superfine particles.

Various kinds of structures can be manufactured from the complex material. Artificial light-emitting sheets, artificial light-emitting hair and artificial light-emitting fiber are possible examples. Further from such artificial light-emitting hair or artificial light-emitting fiber, artificial light-emitting hair structures, artificial light-emitting skin, artificial light-emitting bodies can be made.

More specifically, it is possible to manufacture artificial light-emitting hair structure having a conformation in which a plurality of artificial light-emitting hairs composed of the complex material are fixed upright on a substratum, artificial light-emitting skin, and artificial light-emitting body having a conformation in which a plurality of artificial light-emitting hairs composed of the complex material are fixed upright on a body surface. The artificial light-emitting hair typically has a needle-like, fiber-like, or thread-like shape. Thickness of the artificial light-emitting hair may be determined as desired provided it sufficiently bends when touched by hands or fingers of a person and reliably emits light. However, if the artificial light-emitting hair is desired to be flexible, reliably undergo internal stress required for stress emission and thereby emit light easily, and gives favorable tactile impression to a person who touches it, the thickness is preferably controlled to be not thicker than 2 mm, more preferably not thicker than 1 mm, or still more preferably not thicker than 0.5 mm. The lower limit of the thickness of the artificial light-emitting hair is normally 0.1 mm or more, for example, although it may be determined as desired as far as sufficient strength is ensured. The thickness may be uniform in the entire area of the substratum, or may be different locally. Surface density of the artificial light-emitting hair on the substratum may be determined according to need. However, in order to ensure clear emission of light from the location a human hand or finger touches, the surface density is preferably controlled to be one per cm², or more preferably two per cm². The upper limit of the surface density is determined by the thickness of the artificial light-emitting hair used. The surface density may be uniform throughout the entire area of the substratum, or may be different locally. Standing angle of the artificial light-emitting hair relative to the substratum is determined according to need. It may be either 90° or any other angle. Typically, however, it is 90°. This angle may be uniform throughout the entire area of the substratum, or may be different locally. For fixing the artificial light-emitting hair upright on the substratum, any appropriate method may be used essentially. Typically, however, roots of artificial light-emitting hairs are held in holes (either through holes or blind holes) formed in the substratum. The artificial light-emitting hairs are typically aligned at periodical intervals. For example, they are aligned in a regular grid pattern such as a square grid pattern or an equilateral triangular pattern. The pattern of alignment may be uniform throughout the entire area of the substratum, or may be different locally. Artificial hairs not having the light-emitting function may be mixed among the artificial light-emitting hairs if so desired.

To ensure uniform emission from the artificial light-emitting hair, the crystalline superfine particles are preferably dispersed uniformly in the artificial light-emitting hair. To improve the tactile impression of the artificial light-emitting hair or enhance its durability, the artificial light-emitting hair is surface-coated by an organic material layer such as a coating layer. The substratum is preferably made of a flexible material permitting a human hand force to bend it easily. However, any other material may be used as well.

Artificial light-emitting fabric can be manufactured from artificial light-emitting fibers of the complex material. The weaving or knitting cycle of the artificial light-emitting fabric is determined depending upon the intended use. To ensure clear emission just from a portion touched by a human hand, for example, the cycle is preferably once per cm or more, or more preferably twice per cm or more. There are various types of weaving or knitting configurations, and any of them may be selected depending upon the intended use. The artificial light-emitting fabric may be made of artificial light-emitting fibers alone. However, it may be weaved or knitted by using a substratum having periodical through holes, for example, and passing artificial light-emitting fibers through the through holes. In this case, a periodical beautiful pattern will be made on the fabric. The surface density of the through holes in the substratum is preferably one per cm² or more, or more preferably two per cm² or more. If so desired, other fibers not having the light-emitting function may be mixed among the artificial light-emitting fibers.

The above-summarized artificial light-emitting hair structures, artificial light-emitting skins, artificial light-emitting bodies and artificial light-emitting fabrics are suitable for use as bodies or decorations of various kinds of robots (working robots, entertainment robots, amusement robots, and so on), various kinds of home electric devices such as audio devices (including loudspeakers), television sets, video devices, etc. as well as daily goods such as stationery goods.

The features of the second aspect of the invention summarized above are applicable to the third to thirteenth aspects of the invention as well, as far as they are congruous to their natures.

The crystalline superfine particles and their precursor superfine particles explained above can be manufactured by using the inverted micelle method that is a method of synthesizing superfine particles by making use of water droplets having sizes in the order of nanometers and stably dispersed in oil by a surfactant as the field of reaction. This method can readily change the size of the reaction field, and can therefore control the grain size of the superfine particles in a predetermined range, for example, from 5 to 10 nm. Moreover, since the method can make reaction fields of a uniform size, it can manufacture superfine particles remarkably excellent in monodispersibility. Any appropriate surfactant may be used for the inverted micelle method. Examples usable for this purpose are anionic bis-(2-ethylhexyl) sodium sulfosuccinate (AOT), cationic hexadecyltrimethyl ammonium=bromide, cethyldimethylbenzil ammonium=bromide, butyldodecyl dimethyl ammonium-bromide, dioleyl dimethyl ammonium chloride, nonionic pentaoxyethylene glycol dodecyl=ether, hexaoxyethylene glycol dodecyl ether and polyoxyethylene (6) nonylphenyl=ether. As the oil phase, one or more kinds may be selected and used from, for example, cyclohexane, heptane, octane, isooctane, benzene and chlorobenzene. The metal source used for this purpose is not restrictive, but any appropriate metal source may be used for this purpose. For example, appropriate one may be selected from nitrates, sulfates, metal alcoxides, hydroxides, halides, and others, containing the metal forming the crystalline superfine particles to be manufactured. By dissolving metal ions of such a metal source in inverted micelles and bringing about their hydrolytic or precipitating reaction, superfine particles can be synthesized. Further, by crystallizing the precursor superfine particles thus prepared by annealing, irradiation of laser beams, irradiation of ultrasonic waves, irradiation of microwaves, or the like, stress emission superfine particles having a high crystallographic quality, i.e. crystalline superfine particles, can be obtained. For preparing a complex material of crystalline ultrafine particles and another material, the stress emission superfine particles prepared by the above-explained method may be used. However, products obtained at respective steps of their manufacturing process may be used as well. For example, it is possible to complex inverted micelles of metal ions in dissolved in water before hydrolytic or precipitating reaction or precursor superfine particles before final crystallization and thereafter carry out a treatment for their crystallization. In case such precursor superfine particles are used, they may maintain on their surfaces certain organic molecules such as solvent, ligands or surfactant used for the manufacturing reaction, or organic components such as organic structures generated by some chemical changes of those organic molecules. Any forms are acceptable as the way of linkage of such organic components to surfaces of precursor superfine particles or crystalline superfine particles. There are various ways of linkage or interaction such as coordinate linkage, covalent linkage, ionic bond, Van der Waals force, hydrogen bridge, hydrophobic-hydrophilic interaction, interlace of molecular chains. Precursor superfine particles or crystalline superfine particles covered by organic molecules can be obtained easily by drying inverted micelles enveloping precursor superfine particles or crystalline superfine particles. Alternatively, they are obtained by modifying their surfaces by ligand exchange with desired organic molecules as well. For example, their surfaces may be coated by molecules of polyoxyethylene (1) laurylether phosphoric acid or polyoxyethylene (4, 5) laurylether. When the material to be complexed is selected from materials affinitive to organic molecules or others maintained on surfaces of the particles, a complex material excellent in dispersibility can be prepared. An example of such materials is an organic silicone compound having siloxane bonds. In this case, siloxane couples to hydrophobic groups of a surfactant on surfaces of the particles. It is also possible to rinse inverted micelles enveloping precursor superfine particles or crystalline superfine particles with an organic solvent, for example, and use them as precursor superfine particles or crystalline superfine particles having nothing on their surfaces.

According to the third aspect of the invention, there is provided a method of manufacturing a crystalline superfine particle which emits light depending upon the time-rate-of-change of a stress applied thereto, comprising:

forming a substance in which metal ions of a metal for forming the crystalline superfine particle dissolves in water contained in a molecular aggregate which orient hydrophilic groups of surfactant molecules inward and hydrophobic groups thereof outward in a nonpolar solvent.

The grain size of the crystalline superfine particles is preferably controlled in the range from 5 nm to 100 nm for the reason already explained. However, it need not be limited so. The mean grain size of water inside the molecular aggregate, that is, the size of the water droplet as the reaction field in the surfactant, may be determined in accordance with the grain size of the crystalline superfine particles to be manufactured. For example, it may be controlled in the range from 5 nm to 100 nm. The surfactant, oil phase, metal source, and so on, may be selected from the materials introduced above, for example. The hydrophilic groups of the surfactant typically have hydrophilic bonds expressed by —$O_3^-$, $R_2N^+R_2$ (R: Alkyl group), —OH, —$(OCH_2CH_2)_n$—, —O—, —N=, or the like, and the hydrophobic groups of the surfactant typically have the form of straight or branched alkyl chains.

Concentration of metal ions in the water enveloped by the molecule aggregate is typically 10 mol/l relative to the water. Especially when the crystalline superfine particles have a composition expressed by the general formula $A_xB_yO_z$, metal ions in the water enveloped by the molecular aggregates are ions of alkaline earth metals composing A or ions of the metal composing B, and the ratio of the ions of the metal composing A relative to ions of the alkaline earth metal composing A is from 0.1 to 5. Furthermore, the water enveloped by the molecular aggregates typically contains 0.2 mol or less of rare earth elements or transition metal elements in total relative to 1 mol of ions of the alkaline earth metal as the component A. For example, at least Eu is contained in the rare earth elements or the transition metal elements.

After the product is formed in the nonpolar solvent, in which product the ions of the metal that will compose the crystalline superfine particles are dissolved in the water enveloped in inverted micelles that are molecular aggregates orienting hydrophilic groups of the surfactant inward and hydrophobic groups outward, the product undergoes a treatment for inducing hydrolytic or precipitating reaction of the metal ions dissolved in the inverted micelles. As a result, precursor superfine particles are synthesized. If precipitation reaction is intended, the precipitant used may be, for example, ammonia water ($NH_4OH$), hydrogen peroxide ($H_2O_2$), or the like. Then, once the prepared precursor superfine particles crystallize under a treatment such as annealing, irradiation of laser beams, irradiation of ultrasonic waves or irradiation of microwaves, for example, crystalline superfine particles are obtained. If crystalline superfine particles of oxides are desired, for example, addition of a precipitant such as ammonia water results in generating hydroxides of a metal and they become precursor superfine particles. Therefore, oxygen required for forming oxides is supplied from them. Oxygen necessary for forming the oxides can be supplied by using an atmosphere containing oxygen in the process of crystallization as well.

Alternatively, the crystalline superfine particles can be obtained by first obtaining the product in which ions of the metal that will form the crystalline superfine particles are dissolved in the water enveloped by inverted micelles as mentioned above, and thereafter carrying out annealing, irradiation of laser beams, irradiation of ultrasonic waves, irradiation of microwaves, or the like, for crystallization in an adequate atmosphere suitable for the substance that will form the crystalline superfine particles. For example, if crystalline superfine particles composed of oxides are desired, then an atmosphere containing oxygen may be used. If crystalline superfine particles composed of sulfides are desired, then an atmosphere containing sulfur (for example, $H_2S$ atmosphere) may be used.

Alternatively, the crystalline superfine particles can be obtained by first obtaining the product in which ions of the metal that will form the crystalline superfine particles are dissolved in the water enveloped by inverted micelles as mentioned above, and thereafter directly inducing hydrolytic or precipitating reaction of the metal ions dissolved in the inverted micelles.

If crystalline superfine particles composed of sulfides are desired, for example, then the above-mentioned inverted micelles containing the metal ions are brought into reaction with inverted micelles containing a precipitant such as $Na_2S$. Thus, the crystalline superfine particles can be readily, directly synthesized.

The features of the third aspect of the invention summarized above are applicable to the fourth to thirteenth aspects of the invention as well, as far as they are congruous to their natures.

According to the fourth aspect of the invention, there is provided a method of manufacturing a crystalline superfine particle which emits light depending upon the time-rate-of-change of a stress applied thereto, comprising:

forming a substance in which metal ions of a metal for forming a precursor superfine particle of the crystalline superfine particle dissolves in water contained in a molecular aggregate which orient hydrophilic groups of surfactant molecules inward and hydrophobic groups thereof outward in a nonpolar solvent.

In general, grain size of the precursor superfine particles is presumed to be slightly larger than the grain size of crystalline superfine particles to be manufactured. Approximately, however, it is equivalent to the grain size of the crystalline superfine particles to be manufactured, and it may be, for example, from 5 nm to 100 nm.

After the product is formed in the nonpolar solvent, in which product precursor superfine particles of the crystalline superfine particles are dissolved in the water enveloped in inverted micelles that are molecular aggregates orienting hydrophilic groups of the surfactant inward and hydrophobic groups outward, the precursor superfine particles undergo a treatment for crystallization, such as annealing, irradiation of laser beams, irradiation of ultrasonic waves or irradiation of microwaves. As a result, stress emission superfine particles having a high crystallographic property, i.e. crystalline superfine particles, are obtained.

According to the fifth aspect of the invention, there is provided a method of manufacturing a crystalline superfine particle which emits light depending upon the time-rate-of-change of a stress applied thereto, comprising:

forming a substance in which the crystalline superfine particle is contained in water which is contained in a molecular aggregate orienting hydrophilic groups of surfactant molecules inward and hydrophobic groups thereof outward in a nonpolar solvent.

In this case, no treatment for crystallization is needed because crystalline superfine particles are formed directly in inverted micelles.

According to the sixth aspect of the invention, there is provided a inverted micelle to be used for manufacturing a crystalline superfine particle which emits light depending upon the time-rate-of-change of a stress applied thereto, characterized in containing metal ions of a metal for forming the crystalline superfine particle in water contained in a molecular aggregate which orients hydrophilic groups of surfactant molecules inward and hydrophobic groups thereof outward in a nonpolar solvent.

According to the seventh aspect of the invention, there is provided an inverted micelle enveloping a precursor superfine particle, which is used to manufacture a crystalline superfine particle which emits light depending upon the time-rate-of-change of a stress applied thereto, characterized in containing a precursor superfine particle in water contained in a molecular aggregate which orients hydrophilic groups of surfactant molecules inward and hydrophobic groups thereof outward in a nonpolar solvent.

According to the eighth aspect of the invention, there is provided an inverted micelle enveloping a crystalline superfine particle, which is used for manufacturing a crystalline superfine particle which emits light depending upon the time-rate-of-change of a stress applied thereto, characterized in containing the crystalline superfine particle in water contained in a molecular aggregate which orients hydrophilic groups of surfactant molecules inward and hydrophobic groups thereof outward in a nonpolar solvent.

According to the ninth aspect of the invention, there is provided a precursor superfine particle to be used for manufacturing a crystalline superfine particle which emits light depending upon the time-rate-of-change of a stress applied thereto, characterized in changing to the crystalline superfine particle when crystallized.

According to the tenth aspect of the invention, there is provided a complex material comprising:

inverted micelles to be used for manufacturing crystalline fine particles which emit light depending upon the time-rate-of-change of a stress applied thereto, in which molecular aggregates each orienting hydrophilic groups of surfactant molecules inward and hydrophobic groups thereof outward in a nonpolar solvent, and each contain water in which metal ions of a metal for forming the crystalline superfine particles are dissolved; and another material complexed with the inverted micelles.

For manufacturing the complex material, treatment for crystallization, such as annealing, irradiation of laser beams, irradiation of ultrasonic waves, irradiation of microwaves, or the like, may be carried out in an adequate atmosphere suitable for the substance that will form the crystalline superfine particles. For example, if crystalline superfine particles composed of oxides are desired, then an atmosphere containing oxygen may be used. If crystalline superfine particles composed of sulfides are desired, then an atmosphere containing sulfur (for example, $H_2S$ atmosphere) may be used. As a result, stress emission superfine particles having a high crystallographic property, i.e. crystalline superfine particles, are obtained.

According to the eleventh aspect of the invention, there is provided a complex material comprising:

inverted micelles enveloping precursor superfine particles to be used for manufacturing crystalline fine particles which emit light depending upon the time-rate-of-change of a stress applied thereto, in which molecular aggregates each orienting hydrophilic groups of surfactant molecules inward and hydrophobic groups thereof outward in a nonpolar solvent, and each contain water in which the precursor superfine particle is enveloped; and another material complexed with the inverted micelles.

For manufacturing the complex material, treatment for crystallization, such as annealing, irradiation of laser beams, irradiation of ultrasonic waves, irradiation of microwaves, or the like, may be carried out. As a result, stress emission superfine particles having a high crystallographic property, i.e. crystalline superfine particles, are obtained.

If the other material is a resin, for example, surfactants on the micelles enveloping the precursor superfine particles bonds to the resin components by a Van der Waals force, hydrogen bridges or chemical linkage, for example.

According to the twelfth aspect of the invention, there is provided a complex material comprising:

inverted micelles enveloping crystalline superfine particles to be used for manufacturing crystalline fine particles which emit light depending upon the time-rate-of-change of a stress applied thereto, in which molecular aggregates each orienting hydrophilic groups of surfactant molecules inward and hydrophobic groups thereof outward in a nonpolar solvent, and each contain water in which the crystalline superfine particle is enveloped; and another material complexed with the inverted micelles.

For manufacturing this complex material, no treatment for crystallization is required because the crystalline superfine particles are enveloped in the inverted micelles.

If the other material is a resin, for example, surfactants on the micelles enveloping the precursor superfine particles bonds to the resin components by a Van der Waals force, hydrogen bridges or chemical linkage, for example.

According to the thirteenth aspect of the invention, there is provided a complex material comprising:

precursor superfine particles used to manufacture crystalline superfine particles which emit light depending upon the time-rate-of-change of a stress applied thereto, and changeable to the crystalline superfine particles when crystallized; and another material complexed with the inverted micelles.

For manufacturing this complex material, treatment for crystallization, such as annealing, irradiation of laser beams, irradiation of ultrasonic waves, irradiation of microwaves, or the like, may be carried out. As a result, stress emission superfine particles having a high crystallographic property, i.e. crystalline superfine particles, are obtained.

As summarized heretofore, the present invention can realize crystalline superfine particles that are excellent in dispersibility in a material to be complexed therewith, do not scatter or reflect visible light, and are easy to manufacture and handle by controlling the grain size of the crystalline superfine particles in the range from 5 nm to 100 nm.

Additionally, the complex material prepared by complexing crystalline superfine particles having a grain size from 5 nm to 100 nm with another material can be used to obtain having a desires function by selecting the other material depending upon the intended use. For example, if a flexible resin is selected as the other material, the stress emission material will emit light easily with a human hand or finger touch. If a transparent material is selected as the other material, the stress emission material will be normally transparent and will emit light only when stressed by an external energy.

Furthermore, once inverted micelles with or without enveloping precursor superfine particles therein are formed, crystalline superfine particles of a desired grain size can be manufactured easily by carrying out secondary treatments including crystallization. Alternatively, once inverted micelles enveloping crystalline superfine particles therein are formed, crystalline superfine particles can be manufactured directly.

Moreover, in case a complex material is formed by complexing inverted micelles enveloping precursor superfine particles therein or precursor superfine particles themselves with another material, once some adequate secondary treatments including crystallization is carried out, a complex material composed of crystalline superfine particles of a desired grain size and the other material can be manufactured easily. Alternatively, by complexing inverted micelles enveloping crystalline superfine particles with another material, the complex material composed of crystalline superfine particles of a desired grain size and the other material can be manufactured easily.

Furthermore, when artificial light-emitting hair or artificial light-emitting fiber is manufactured from the complex material, the artificial light-emitting hair or the artificial light-emitting fiber can emit light easily only with a light hand or finger of a person. Further, emission of light stops immediately after removal of the touch. Thus, the user can induce and acknowledge emission of light by giving a light touch to the product, and can feel comfortable with it, or it effectively induce his/her interest.

The above and other objects and features of the present invention will become apparent from the following detailed description and the appended claims with reference to the accompanying drawings.

DETAILED DESCRIPTION OF THE PREFERRED EMBODIMENTS

Figure 1:
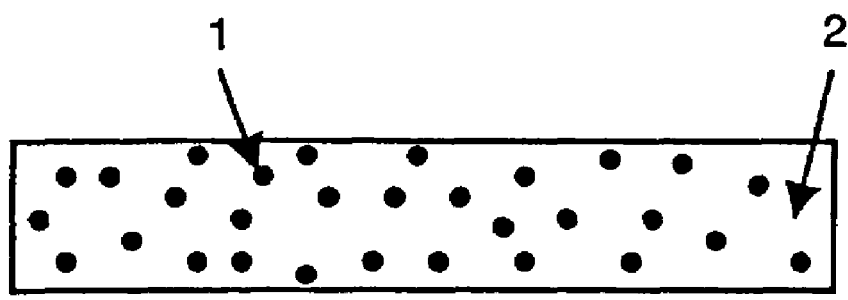
FIG. 1 is a cross-sectional view of a complex material according to the first embodiment of the invention.

Some embodiments of the invention will now be explained below with reference to the drawings. In all figures illustrating the embodiments, identical or equivalent components are labeled with common reference numerals.

Figure 2:
FIG. 2 is a schematic diagram of a crystalline superfine particle used in the first embodiment of the invention.

FIG. 1 is a cross-sectional view of a complex material according to the first embodiment of the invention. In the complex material, crystalline superfine particles 1 having a grain size from 5 to 100 nm and emitting light when stressed are dispersed in another material 2. FIG. 2 shows a crystalline superfine particle 1. Various kinds of substances are usable as the crystalline superfine particles 1 and the other material 2. In this case, however, the crystalline superfine particles 1 are composed of $SrAl_2O_4$:Eu, and the other material 2 is polyester resin. In this complex material, individual crystalline superfine particles 1 disperse discretely without contacting with each other.

A method of manufacturing the complex material having the above-explained configuration is explained below.

First, crystalline superfine particles 1 composed of $SrAl_2O_4$:Eu are manufactured by the inverted micelle method as explained below.

A predetermined amount of the following substance used as the source material is stirred in sample tubes for one hour.

In sample tube 1

| | |
|---|---|
| strontium nitrate (source of Sr) | 0.00667 mol |
| aluminum nitrate 9 hydrate (source of Al) | 0.00333 mol |
| europium nitrate 6 hydrate (source of Eu) | 0.0000167 mol |
| ion-exchange water | 5 ml |

In sample tube 2

| | |
|---|---|
| ammonia water (precipitant) | 2 ml |
| hydrogen peroxide (precipitant) | 0.3 ml |
| water | 2.7 ml |

In sample tube 3

| | |
|---|---|
| AOT (surfactant) | 0.0 mol |
| isooctane (oil phase) | 100 ml |

Figure 3:
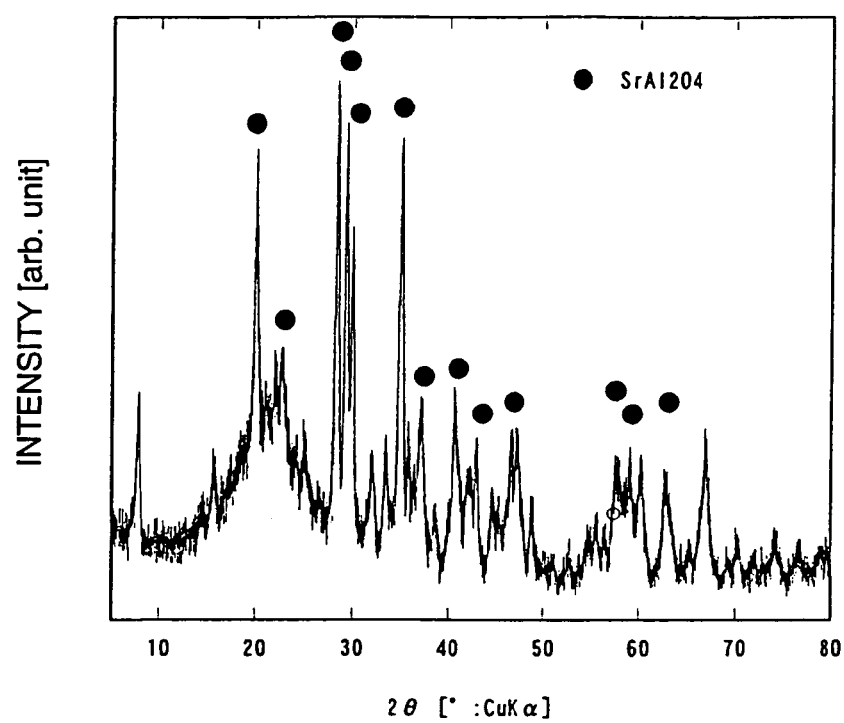
FIG. 3 is a diagram showing an X-ray diffraction pattern of crystalline superfine particles used in the first embodiment of the invention.
Figure 4:
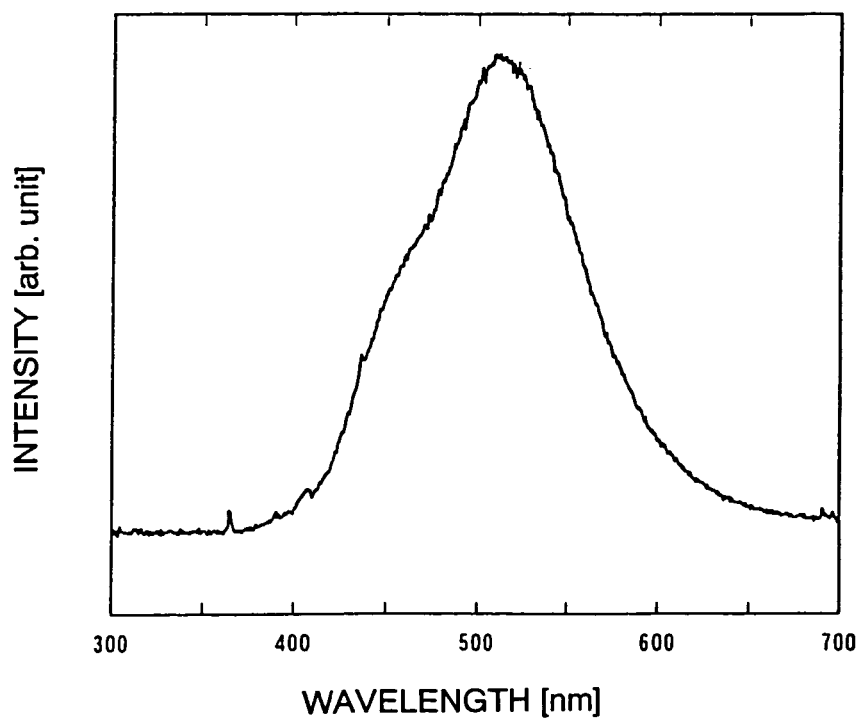
FIG. 4 is a schematic diagram showing emission spectrum by ultraviolet excitation of crystalline superfine particles used in the first embodiment of the invention.

The solution in the sample tube 3 is divided into two equal parts, and individual parts are added to the solutions in the sample tubes 1 and 2. After the solutions in the sample tubes 1 and 2 are stirred for one hour, the solution in the sample tube 1 is poured into a separable flask having a heating/circulating device, and it is heated to 150° C. Thereafter, the solution in the sample tube 2 is slowly added to the separable flask to start reaction. Heating is stopped at two hours past the start of reaction, and the separable flask is cooled to the room temperature. Precursor superfine particles obtained are centrifugally separated (for example, at 4000 rpm), and the supernatant liquid is removed. Thus, inverted micelles enveloping precursor superfine particles are obtained. Further, the micelles enveloping precursor superfine particles are heated on a hot plate held at 100° C. to remove water in the inverted micelles. Thus, precursor superfine particles covered by organic molecules are obtained. Further, the sediment obtained by centrifugal separation of the inverted micelles enveloping precursor superfine particles was rinsed with acetone to obtain precursor superfine particles. The crystalline superfine particles 1 were obtained by treatments for crystallization of the precursor superfine particles, namely, calcination in oxygen at 1400° C. and reduction annealing in a nitrogen atmosphere containing hydrogen (5%) at 1200° C. The X-ray diffraction pattern of the crystalline superfine particles 1, thus obtained, is shown in FIG. 3. It will be appreciated from FIG. 3 that the product is substantially composed of the intended crystalline phase, and the resulting substance was indexed by the monoclinic system similarly to a known article (F. Hanic, T. Y. Chemekova and J. Mailing, F. Appl. Phys., 12 (1979) 243). FIG. 4 shows emission spectrum appearing when the crystalline superfine particles are excited by ultraviolet rays of the wavelength 254 nm from a mercury lamp.

After that, polyester resin and powder of the crystalline superfine particles 1 obtained as explained above are blended and mingled by the ratio of 1:2 in weight. The product was shaped in form of a sheet of several centimeters each side, and left for one whole day. As a result, an inorganic/organic complex sheet was obtained. This sheet is a thin sheet as thin as less than 1 mm. It was see-through, and it was confirmed that a transparent sheet could be prepared. With this sheet, emission of light was confirmed only with a light manual bending force in the dark.

As explained above, according to the first embodiment, since the complex material is manufactured by first manufacturing the crystalline superfine particles 1 composed of $SrAl_2O_4$:Eu having a grain size from 5 to 100 nm and emitting light under a stress by using the inverted micelle method and by dispersing them in the polyester resin used as the other material 2, it is possible to obtain a stress emission material that is excellent in dispersibility of the crystalline superfine particles 1, enhanced in emission efficiency and moreover transparent. With this complex material, any user can readily induce emission of light by applying his/her light manual bending force, or the like, and can induce emission only he/she touches it.

Next explained is a complex material according to the second embodiment of the invention.

Figure 5:
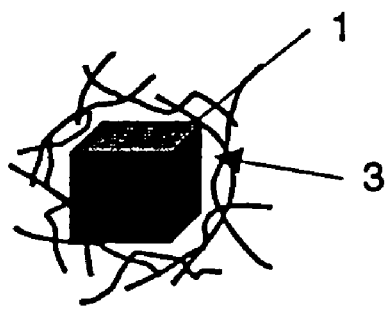
FIG. 5 is a schematic diagram showing a crystalline superfine particle covered by organic molecules, which is used in the second embodiment of the invention.

In this complex material, covered crystalline superfine particles 4 having coating of organic molecules 3 on crystalline superfine particles 1 as shown in FIG. 5 are used instead of the crystalline superfine particles 1 used in the first embodiment. In the other respects, the features set forth in conjunction with the first embodiment are applicable here again.

This complex material is manufactured by substantially the same manufacturing method as the first embodiment. However, the manufacturing method used here is different in blending a polyester resin as the other material and covered crystalline superfine particles 4 coated by organic molecules to form the complex material.

The second embodiment also has the same advantages as those of the first embodiment.

Next explained is a complex material according to the third embodiment of the invention.

Figure 6:
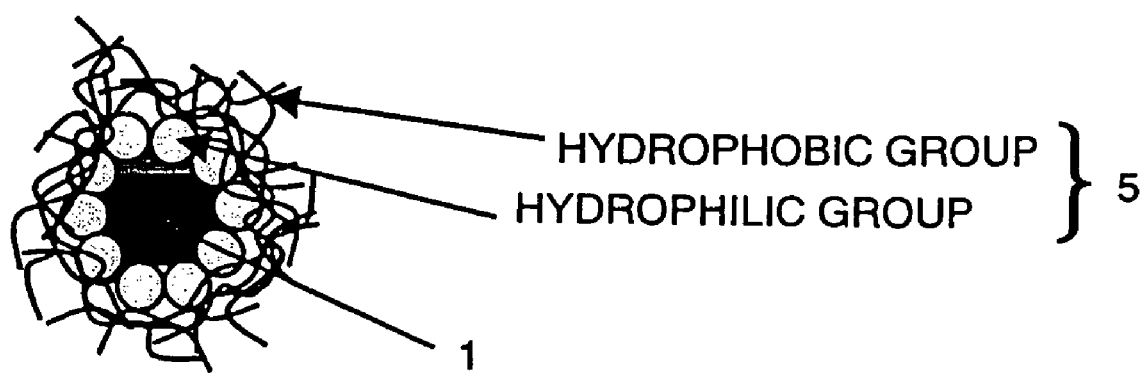
FIG. 6 is a schematic diagram showing a crystalline superfine particle covered by organic molecules, which is used in the third embodiment of the invention.

In this complex material, a surfactant 5 shown in FIG. 6 is employed as the organic molecules 3 shown in the second embodiment. In the other respects, the features set forth in conjunction with the first embodiment are applicable here again.

This complex material is manufactured by substantially the same manufacturing method as the first embodiment. However, the manufacturing method used here is different in blending a polyester resin as the other material and covered crystalline superfine particles 4 coated by organic molecules to form the complex material.

The third embodiment also has the same advantages as those of the first embodiment.

Next explained is a complex material according to the fourth embodiment of the invention.

Figure 7:
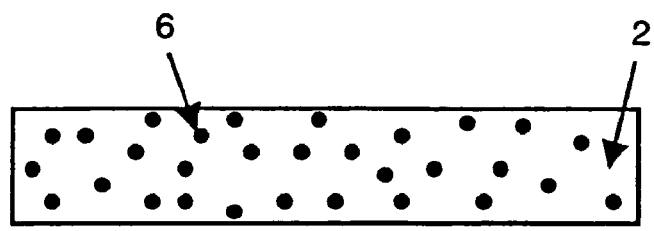
FIG. 7 is a cross-sectional view of a complex material first manufactured in the fourth embodiment of the invention.
Figure 8:
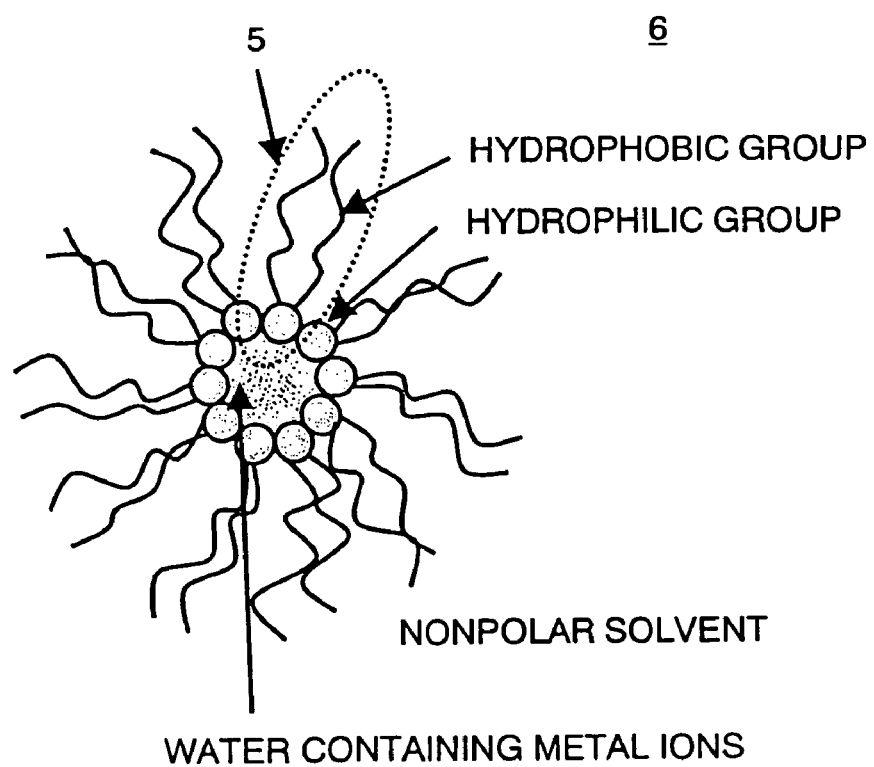
FIG. 8 is a schematic diagram showing an inverted micelle used in the fourth embodiment of the invention.

As shown in FIG. 7, inverted micelles shown in FIG. 8 and the other material 2 are first blended to obtain the complex material. As shown in FIG. 8, each inverted micelle 6 contains water in the center, in which Sr, Al and Eu ions as metal ions dissolve.

After that, the complex material undergoes treatments for crystallization, such as annealing, irradiation of laser beams, irradiation of ultrasonic waves, irradiation of microwaves, or the like, in an atmosphere containing oxygen. As a result, crystalline superfine particles 1 composed of $SrAl_2O_4$:Eu are obtained, and the complex material composed of the crystalline superfine particles 1 and the other material 2 is obtained.

In the other respects, the features set forth in conjunction with the first embodiment are applicable here again.

The fourth embodiment also has the same advantages as those of the first embodiment.

Next explained is a complex material according to the fifth embodiment of the invention.

Figure 9:
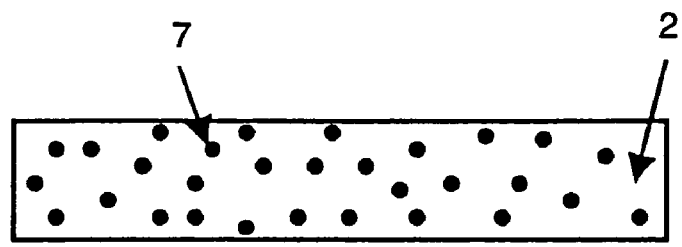
FIG. 9 is a cross-sectional view of a complex material first manufactured in the fifth embodiment of the invention.
Figure 10:
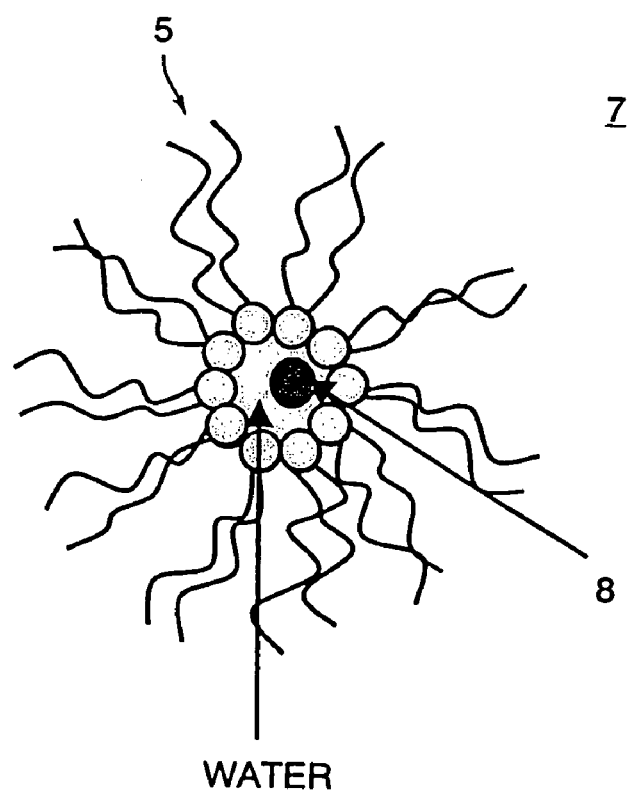
FIG. 10 is a schematic diagram showing an inverted micelle enveloping a precursor superfine particle, which is used in the fifth embodiment of the invention.

As shown in FIG. 9, inverted micelles 7 enveloping precursor superfine particles as shown in FIG. 10 and the other material 2 are first blended, and the complex material is obtained. As shown in FIG. 10, each inverted micelle 7 enveloping a precursor superfine particle contains water in its center, and envelopes in the water a precursor superfine particle 8 containing O in addition to Sr, Al and Eu.

Thereafter, the complex material undergoes treatments for crystallization such as annealing, irradiation of laser light, irradiation of ultrasonic waves, irradiation of microwaves, or the like. Thereby, the precursor superfine particles 8 crystallize. As a result, the crystalline superfine particles 1 composed of $SrAl_2O_4$:Eu are obtained, and the complex material composed of these crystalline superfine particles 1 and the other material 2 is obtained.

In the other respects, the features set forth in conjunction with the first embodiment are applicable here again.

The fifth embodiment also has the same advantages as those of the first embodiment.

Next explained is a complex material according to the sixth embodiment of the invention.

Figure 11:
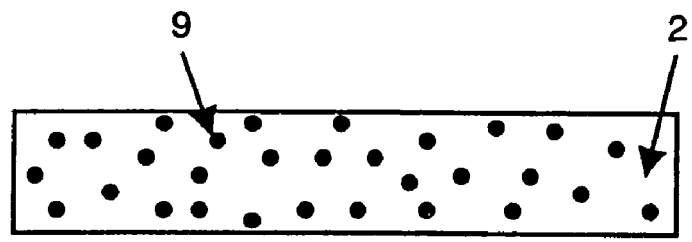
FIG. 11 is a cross-sectional view of a complex material fist manufactured in the sixth embodiment of the invention.
Figure 12:
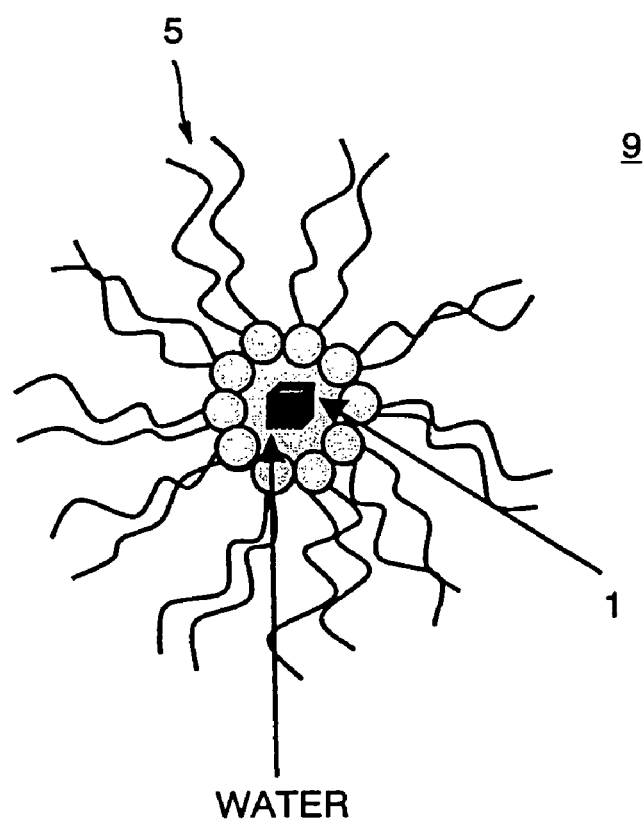
FIG. 12 is a schematic diagram showing an inverted micelle enveloping a crystalline superfine particle, which is used in the sixth embodiment of the invention.

As shown in FIG. 11, the complex material according to this embodiment is manufactured by blending and mingling inverted micelles 9 enveloping crystalline superfine particles as shown in FIG. 12 and the other material 2. As shown in FIG. 12, each inverted micelle 9 enveloping a crystalline superfine particle contains water in its center, and envelopes in the water the crystalline superfine particle 1 that emits light under a stress.

Thereafter, the complex material undergoes a treatment such as annealing, irradiation of laser light, irradiation of ultrasonic waves, irradiation of microwaves, or the like. Thereby, water contained in the inverted micelles 9 is removed. As a result, the complex material composed of crystalline superfine particles 1 made of $SrAl_2O_4$:Eu and the other material 2 is obtained.

In the other respects, the features set forth in conjunction with the first embodiment are applicable here again.

The sixth embodiment also has the same advantages as those of the first embodiment.

Next explained is a complex material according to the seventh embodiment of the invention.

Figure 13:
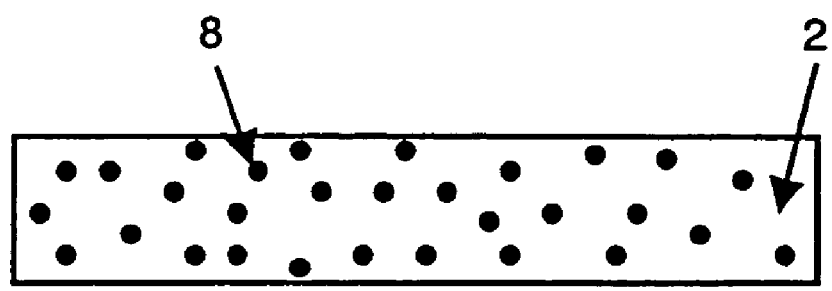
FIG. 13 is a cross-sectional view of a complex material first manufactured in the seventh embodiment of the invention.
Figure 14:
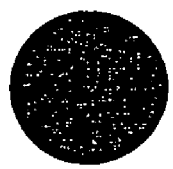
FIG. 14 is a schematic diagram showing a precursor superfine particle used in the seventh embodiment of the invention.

As shown in FIG. 13, the complex material according to this embodiment is first manufactured by blending precursor superfine particles 8 shown in FIG. 14 and the other material 2. The precursor superfine particles 8 contain O in addition to Sr, Al and Eu.

After that, the complex material undergoes treatments for crystallization, such as annealing, irradiation of laser beams, irradiation of ultrasonic waves, irradiation of microwaves, or the like. Thereby, the precursor superfine particles 8 crystallize. As a result, crystalline superfine particles 1 composed of $SrAl_2O_4$:Eu are obtained, and the complex material composed of the crystalline superfine particles 1 and the other material 2 is obtained.

In the other respects, the features set forth in conjunction with the first embodiment are applicable here again.

The seventh embodiment also has the same advantages as those of the first embodiment.

Next explained is a complex material according to the eighth embodiment of the invention.

Figure 15:
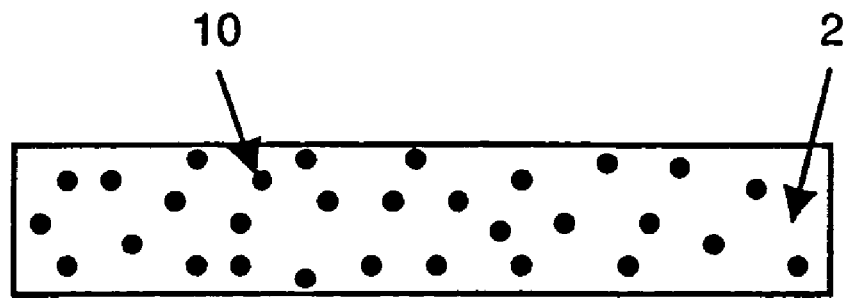
FIG. 15 is a cross-sectional view of a complex material first manufactured in the eighth embodiment of the invention.
Figure 16:
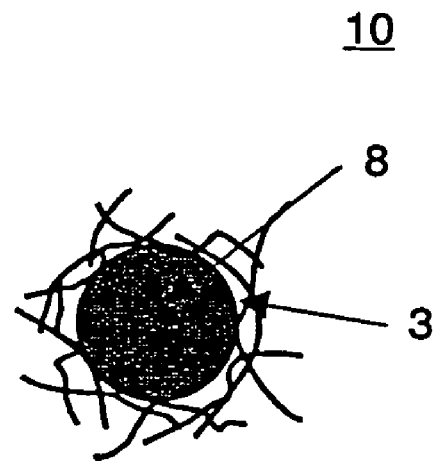
FIG. 16 is a schematic diagram showing a precursor superfine particle covered by organic molecules, which is used in the eighth embodiment of the invention.

As shown in FIG. 15, the complex material is first manufactured by blending covered precursor superfine particles 10 coated by organic molecules as shown in FIG. 16 with the other material 2. In each covered precursor superfine particle 10, organic molecules 3 cover the surface of the precursor superfine particle 8 containing O in addition to Sr, Al and Eu.

Thereafter, the complex material undergoes a treatment for crystallization, such as annealing, irradiation of laser light, irradiation of ultrasonic waves, irradiation of microwaves, or the like. Thereby, the precursor superfine particles 8 crystallize. As a result, crystalline superfine particles 1 composed of $SrAl_2O_4$:Eu and covered by organic molecules 3 are obtained, and the complex material composed of these crystalline superfine particles 1 and the other material 2 is obtained.

In the other respects, the features set forth in conjunction with the first embodiment are applicable here again.

The eighth embodiment also has the same advantages as those of the first embodiment.

Next explained is a complex material according to the ninth embodiment of the invention.

Figure 17:
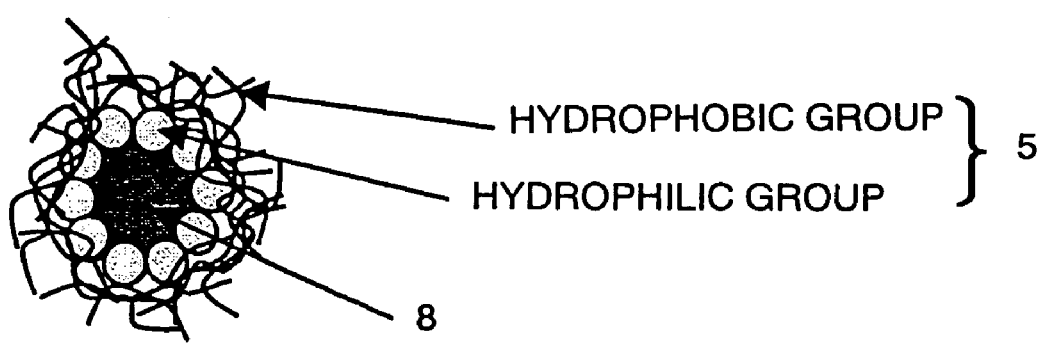
FIG. 17 is a schematic diagram showing a precursor superfine particle covered by organic molecules, which is used in the ninth embodiment of the invention.

In this complex material, a surfactant 5 shown in FIG. 17 is employed as the organic molecules 3 of the covered precursor superfine particles coated by organic molecules, which was shown in the eighth embodiment. In the other respects, the features set forth in conjunction with the first and eighth embodiments are applicable here again.

The ninth embodiment also has the same advantages as those of the first embodiment.

Next explained is a complex material according to the tenth embodiment of the invention.

Figure 18:
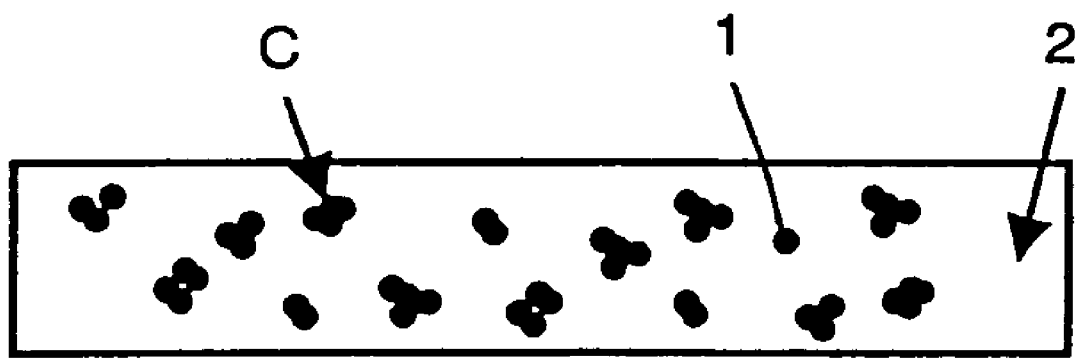
FIG. 18 is a cross-sectional view of a complex material according to the tenth embodiment of the invention.

FIG. 18 is a cross-sectional view of the complex material. In the complex material shown in FIG. 18, crystalline superfine particles 1 having a grain size of 5 to 100 nm and capable of emitting light under a stress coagulate and form aggregates C. Size of the aggregates C is equal to or smaller than 100 nm.

Although the crystalline superfine particles 1 in this complex material form aggregates C, since their size does not exceed 100 nm, transparency of the complex material is ensured.

The tenth embodiment also has the same advantages as those of the first embodiment.

Next explained is a complex material according to the eleventh embodiment of the invention.

In this complex material, crystalline superfine particles 4 covered by organic molecules are used instead of crystalline superfine particles 1 used in the tenth embodiment. The crystalline superfine particles 4 covered by organic molecules coagulate together and form aggregates C.

In the other respects, the features set forth in conjunction with the first, second and tenth embodiments are applicable here again.

The eleventh embodiment also has the same advantages as those of the first embodiment.

Next explained is a complex material according to the twelfth embodiment of the invention.

In this complex material, a surfactant 5 is employed as the organic molecules 3 shown in the eleventh embodiment. Thus, the crystalline superfine particles 4 covered the organic molecules, i.e. the surfactant 5, coagulate, and form aggregates C.

In the other respects, the features set forth in conjunction with the first, third and tenth embodiments are applicable here again.

The twelfth embodiment also has the same advantages as those of the first embodiment.

Next explained is a complex material according to the thirteenth embodiment of the invention.

In this embodiment, the complex material is first manufactured by blending inverted micelles 6 as shown in FIG. 8 and the other material 2. In this blending process, the inverted micelles 6 coagulate for some reason, and form aggregates.

After that, the complex material undergoes a treatment for crystallization, such as annealing, irradiation of laser light, irradiation of supersonic waves, irradiation of microwaves, or the like. As a result, the complex material composed of crystalline superfine particles 1 made of $SrAl_2O_4$:Eu and the other material 2 is obtained. In this complex material, crystalline superfine particles 1 coagulate, and form aggregates C.

In the other respects, the features set forth in conjunction with the first, fourth and tenth embodiments are applicable here again.

The thirteenth embodiment also has the same advantages as those of the first embodiment.

Next explained is a complex material according to the fourteenth embodiment of the invention.

In this embodiment, the complex material is first manufactured by blending inverted micelles 7 enveloping precursor superfine particles shown in FIG. 10 and the other material 2. In the blending process, the inverted micelles 7 enveloping the precursor superfine particles coagulate for some reason and form aggregates.

After that, the complex material undergoes a treatment for crystallization, such as annealing, irradiation of laser light, irradiation of supersonic waves, irradiation of microwaves, or the like. Thereby, the precursor superfine particles 8 crystallize. As a result, the complex material composed of crystalline superfine particles 1 made of $SrAl_2O_4$:Eu and the other material 2 is obtained. In this complex material, crystalline superfine particles 1 coagulate, and form aggregates C.

In the other respects, the features set forth in conjunction with the first, fifth and tenth embodiments are applicable here again.

The fourteenth embodiment also has the same advantages as those of the first embodiment.

Next explained is a complex material according to the fifteenth embodiment of the invention.

In this embodiment, the complex material is manufactured by blending inverted micelles 9 enveloping crystalline superfine particles as shown in FIG. 12 with the second material. In the blending process, the inverted micelles 9 enveloping the crystalline superfine particles coagulate for some reason and form aggregates.

Thereafter, the complex material undergoes a treatment such as annealing, irradiation of laser light, irradiation of ultrasonic waves, irradiation of microwaves, or the like. Thereby, water contained in the inverted micelles 9 is removed. As a result, the complex material composed of crystalline superfine particles 1 made of $SrAl_2O_4$:Eu and the other material 2 is obtained. In this complex material, the crystalline superfine particles 1 coagulate, and form aggregates C.

In the other respects, the features set forth in conjunction with the first, sixth and tenth embodiments are applicable here again.

The fifteenth embodiment also has the same advantages as those of the first embodiment.

Next explained is a complex material according to the sixteenth embodiment of the invention.

In this embodiment, the complex material is first manufactured by blending precursor superfine particles 8 shown in FIG. 14 with the other material 2. In this blending process, the precursor superfine particles 8 coagulate for some reason, and form aggregates.

Thereafter, the complex material undergoes a treatment for crystallization, such as annealing, irradiation of laser light, irradiation of ultrasonic waves, irradiation of microwaves, or the like. Thereby, the precursor superfine particles 8 crystallize. As a result, the complex material composed of the crystalline superfine particles 1 made of $SrAl_2O_4$:Eu and the other material 2 is obtained. In this complex material, crystalline superfine particles 1 coagulate, and for aggregates C.

In the other respects, the features set forth in conjunction with the first, seventh and tenth embodiments are applicable here again.

The sixteenth embodiment also has the same advantages as those of the first embodiment.

Next explained is a complex material according to the seventeenth embodiment of the invention.

In this embodiment, the complex material is first manufactured by blending precursor superfine particles 10 covered by organic molecules as shown in FIG. 16 with the other material 2. In the blending process, the precursor superfine particles 10 covered by organic molecules coagulate for some reason, and form aggregates.

After that, the complex material undergoes a treatment for crystallization, such as annealing, irradiation of laser light, irradiation of supersonic waves, irradiation of microwaves, or the like. Thereby, the precursor superfine particles 8 crystallize. As a result, the complex material, which is composed of crystalline superfine particles 1 made of $SrAl_2O_4$:Eu and covered by organic molecules 3, and the other material 2 is obtained. In this complex material, the crystalline superfine particles 1 coagulate, and form aggregates C.

In the other respects, the features set forth in conjunction with the first, eighth and tenth embodiments are applicable here again.

The seventeenth embodiment also has the same advantages as those of the first embodiment.

Next explained is a complex material according to the eighteenth embodiment of the invention.

In this complex material, a surfactant 5 is employed as the organic molecules 3 covering the precursor superfine particles 10 shown in the seventeenth embodiment.

In the other respects, the features set forth in conjunction with the first, eighth, tenth and seventeenth embodiments are applicable here again.

The eighteenth embodiment also has the same advantages as those of the first embodiment.

Next explained is an artificial light-emitting hair structure according to the nineteenth embodiment of the invention.

First, polyester resin and powder of crystalline superfine particles 1 manufactured in the same manner as the first embodiment are blended and mingled by the ratio of 1:2 in weight, and the resulting complex material is poured into a tube of an organic material such as nylon or polyetherimide while soaking it up with a syringe. After that, the tube containing the complex material is left for a whole day until it cures. This was employed as one of hair samples. These steps were repeated, and a required number of artificial light-emitting hairs were produced. The tubes used for the purpose may be nylon tubes having the outer diameter of 0.9 mm and the inner diameter of 0.5 mm or polyetherimide tubes having the outer diameter of 0.5 mm and the inner diameter of 0.3 mm. In this case, thickness of the complex material of each artificial light-emitting hair, which is composed of crystalline superfine particles made of $SrAl_2O_4$:Eu and the polyester resin, is equal to the inner diameter of the tube. That is, it is 0.5 mm or 0.3 mm, for example. The tube forming the investment of each artificial light-emitting hair functions to enhance the elasticity of the artificial light-emitting hair and protect the surface of the artificial light-emitting hair.

Figure 19A:
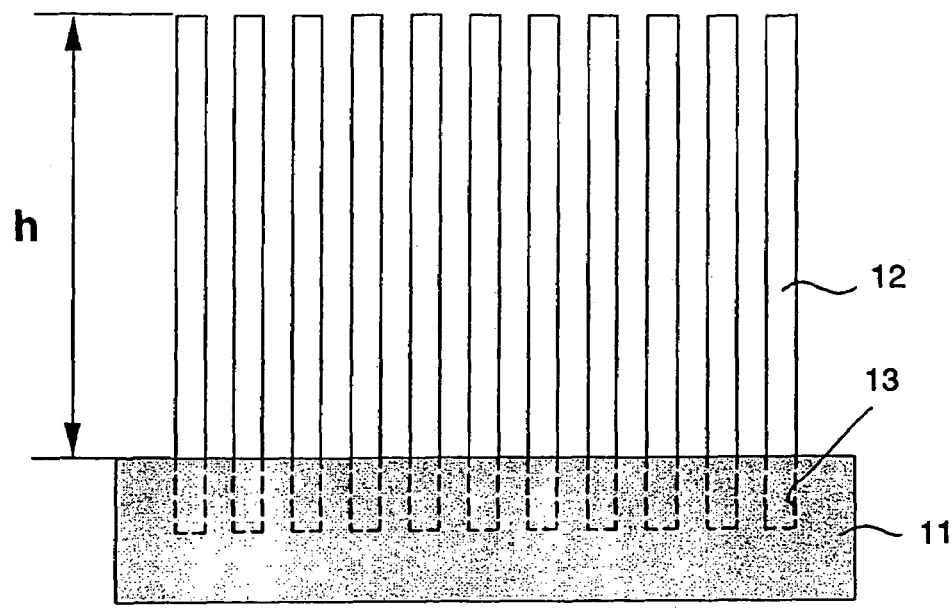
FIG. 19A is a side elevation of an artificial light-emitting hair structure according to the 19th embodiment of the invention.
Figure 19B:
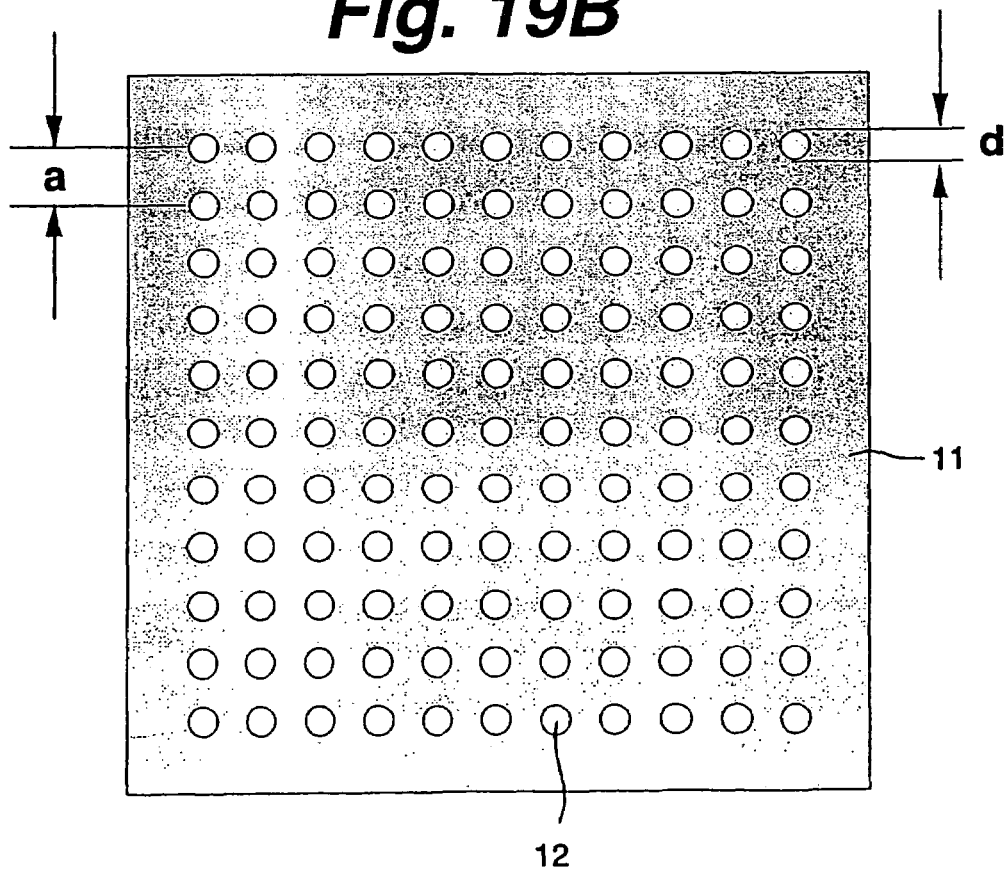
FIG. 19B is a plan view of the artificial light-emitting hair structure shown in FIG. 19A.

FIGS. 19A and 19B show an artificial light-emitting hair structure comprising the artificial light-emitting hairs manufactured in the above-explained manner. FIG. 19A is its side elevation, and FIG. 19B is a plan view.

As shown in FIGS. 19A and 19B, the artificial light-emitting hair structure includes artificial light-emitting hairs 12 fixed to stand from one of major surfaces of a substratum 11 at positions forming a square grid pattern. In this case, the substratum 11 has holes 13 in a square grid pattern, and roots of the artificial light-emitting hairs 12 are inserted in the holes 13 such that the artificial light-emitting hairs 12 stand on the substratum 11. For the fixture, an adhesive may be used, if necessary. The artificial light-emitting hairs 12 used here are manufactured as explained above. For obtaining a sufficiently flexible artificial light-emitting hair 12, diameter d of each artificial light-emitting hair 12 is preferably 2 mm or less in maximum, or more preferably 1 mm or less. For example, it is adjusted in the range from 0.3 to 0.5 mm.

Material and thickness of the substratum 11 are determined adequately so that repetitive bending motion of the artificial light-emitting hairs 12 does not deteriorate the strength of fixture of the artificial light-emitting hairs 12 to the substratum 11, and taking account of the environments where the artificial light-emitting hair structure will be used. Especially, in case of an artificial light-emitting hair structure that will be affixed on a non-planar surface, the substratum 11 is preferably flexible enough to bend easily with a manual force of a person. For example, a resin film such as a polyester resin film is used. Thickness of the substratum 11 is 2 to 3 mm, for example.

The number of artificial light-emitting hairs 12 and their intervals are determined depending upon the intended use. In the example of FIG. 7, eleven hairs in each column and eleven hairs in each row, i.e. 121 hairs in total, are fixed. The interval a (see FIG. 19B) is determined such that the surface density of the artificial light-emitting hairs 12 is one piece per $cm^2$ or more. Typically, the interval may be 2 to 10 mm, for example. In this case, the surface density of the artificial light-emitting hairs 12 is 1 to 25 pieces per $cm^2$.

Height h (see FIG. 19A) of the artificial light-emitting hair 12 is determined in accordance with sensitivities and tastes of users of the artificial light-emitting hair structure. Although the diameter d must be taken account, if a tactile impression similar to that of natural hair or an animal coat is desired to obtain when manually stroking the artificial light-emitting hair 12, the height h of the artificial light-emitting hair 12 is preferably two or three times the diameter d in minimum. Typically, the height h is 5 to 50 times the diameter d, for example. On the other hand, if a skin touch impression is desirable when manually stroking the artificial light-emitting hair 12, the height h of the artificial light-emitting hair 12 should be sufficient low. For example, it may be lower than two or three times the diameter d. Extremely, the height h may be like a dot approximately equal to the diameter d.

The Inventors put the artificial light-emitting hair structure in the dark, and lightly stroked it with a fingertip. Then, the Inventors could confirm that the artificial light-emitting hair 12 immediately emitted intensive light. After the inventors removed the finger stroke, the emission disappeared in a short time. While stroking the artificial light-emitting hair 12 and looking emission of light, the Inventors felt that it stimulated their affections.

According to this embodiment, the sufficiently thin artificial light-emitting hair 12 comprising an inorganic compound emitting light under a stress and a resin is manufactured, and a necessary number of artificial light-emitting hairs 12 are fixed to stand on one major surface of the substratum 11 in a square grid arrangement to make the artificial light-emitting hair structure. Therefore, a user can induce emission of light by lightly stroking the artificial light-emitting hair with his/her hand, and additionally, he/she loses the emission of light from sight immediately after removal of the stroke. Therefore, the user can enjoy not only a favorable tactile impression by stroking it, but also the emission of light when he/she strokes it. This will be effective for consoling the user or improving the user's feeling.

This artificial light-emitting hair structure is suitable for use as artificial light-emitting skin. For example, it may be used to cover the surface of the body of a consolation robot, amusement robot, entertainment robot, or the like.

Figure 20:
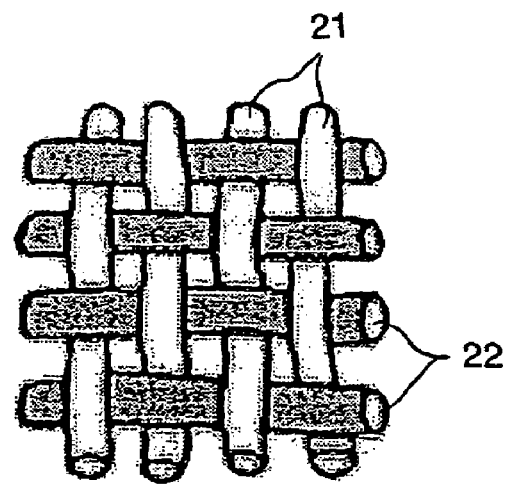
FIG. 20 is a schematic diagram showing an artificial light-emitting fabric according to the 20th embodiment of the invention.

FIG. 20 shows an artificial light-emitting fabric according to the twentieth embodiment of the invention. As illustrated, this artificial light-emitting fabric is weaved or knitted by using artificial light-emitting fibers 21 as lengthwise threads and artificial light-emitting fibers 22 as fillings. The respective artificial light-emitting fibers 21, 22 used to weave or knit the fabric inevitably curve successively in a wavy form.

The artificial light-emitting fibers 21, 22 used here are manufactured in the same manner as the artificial light-emitting hair 12 already explained. To make the In order to obtain artificial light-emitting fibers 21, 22 flexible enough to weave or knit a fabric, diameter of the artificial light-emitting fibers 21, 22 is preferably 2 mm or less in maximum, more preferably 1 mm or less, and still more preferably 0.5 mm or less.

Interval of the artificial light-emitting fibers 21, 22 is determined such that the artificial light-emitting fibers 21, 22 interlace preferably once or more per cm, or more preferably twice or more per cm. Typically, the interval may be 2 to 10 mm, for example. In this case, the interlacing period of the artificial light-emitting fibers 21, 22 is 1 to 5 times per cm.

Needless to say, as the artificial light-emitting fibers 21, 22 become thinner, and the interlacing period of the artificial light-emitting fibers 21, 22 become frequent, the artificial light-emitting fabric becomes denser. Thus, it will be possible to obtain a dense fabric equivalent to a true silk fabric.

According to this embodiment, thin artificial light-emitting fibers 21, 22 are made from the composite material composed of an inorganic compound capable emitting light under a stress and a resin, and the artificial light-emitting fibers 21, 22 are used as lengthwise threads and fillings to weave of knit an artificial light-emitting fabric. Therefore, a user can induce emission of light from the fabric by lightly stroking the artificial light-emitting fibers 21, 22 with his/her hand, and furthermore, he/she loses emission of light from sight immediately after removal of the stroke. Therefore, although the fabric is not covered by hair, the user can get a favorable tactile impression when stroking it, and at the same time, and can enjoy emission of light. This will be effective for consoling the user or improving the user's feeling.

The artificial light-emitting fabric is suitable for use as artificial light-emitting skin. For example, it can be used to cover the surface of the body of a consolation robot, amusement robot, entertainment robot, or the like. It can be used to make clothes as well.

Figure 21:
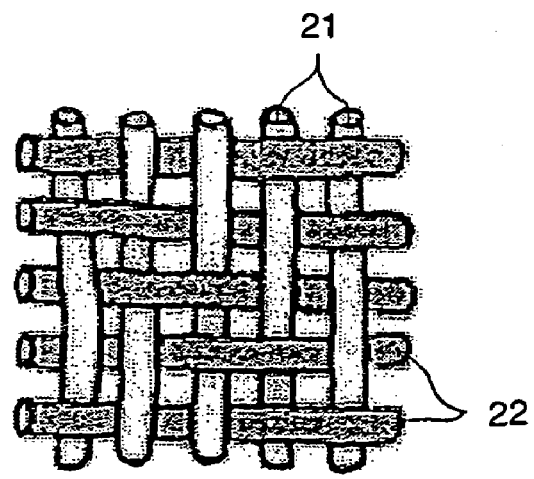
FIG. 21 is a schematic diagram showing an artificial light-emitting fabric according the 21st embodiment of the invention.

FIG. 21 shows an artificial light-emitting fabric according to the twenty-first embodiment of the invention. Similarly to the artificial light-emitting fabric according to the twentieth embodiment, the artificial light-emitting fabric shown in FIG. 21 is also weaved or knitted by using artificial light-emitting fibers 21 as the lengthwise threads and artificial light-emitting fibers 22 as fittings. However, the artificial light-emitting fabric shown here is weaved or knitted in a different pattern. In the other respects, the features of the twentieth embodiment are applicable here again.

The twenty-first embodiment also has the same advantages as those of the twentieth embodiment.

Figure 22:
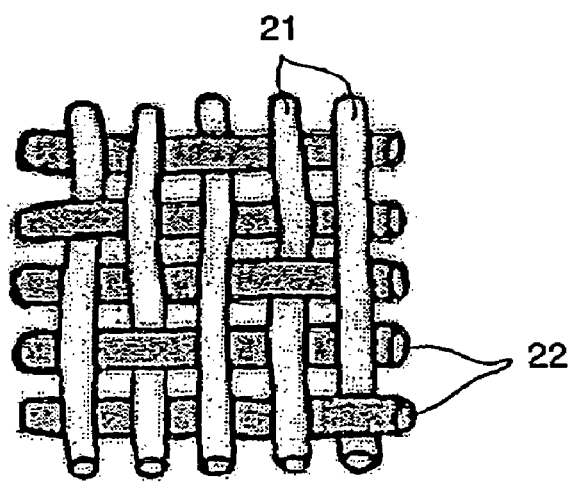
FIG. 22 is a schematic diagram showing an artificial light-emitting fabric according the 22nd embodiment of the invention.

FIG. 22 shows an artificial light-emitting fabric according to the twenty-second embodiment of the invention. Similarly to the artificial light-emitting fabric according to the twentieth and twenty-first embodiments, the artificial light-emitting fabric shown in FIG. 22 is also weaved or knitted by using artificial light-emitting fibers 21 as the lengthwise threads and artificial light-emitting fibers 22 as fittings. However, the artificial light-emitting fabric shown here is weaved or knitted in a different pattern. In the other respects, the features of the twentieth embodiment are applicable here again.

The twenty-second embodiment also has the same advantages as those of the twentieth embodiment.

Figure 23:
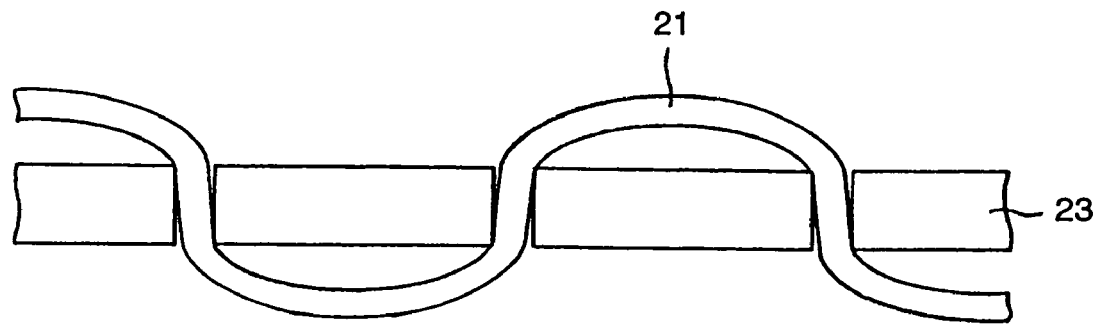
FIG. 23 is a schematic diagram showing an artificial light-emitting fabric according the 23rd embodiment of the invention.

FIG. 23 shows an artificial light-emitting fabric according to the twenty-third embodiment of the invention. Similarly to the artificial light-emitting fabric according to the twentieth, twenty-first and twenty-second embodiments, the artificial light-emitting fabric shown in FIG. 22 is also weaved or knitted by using artificial light-emitting fibers 21 as the lengthwise threads and artificial light-emitting fibers 22 as fittings. However, unlike the preceding embodiments, here is used a substratum having periodical through holes 23 in an arrangement corresponding to the weaving or knitting period of the artificial light-emitting fabric, and the artificial light-emitting fabric is weaved or knitted while passing the artificial light-emitting fibers 21, 22 through the through holes 23. In the other respects, the features of the twentieth embodiment are applicable here again. Also in this mode of weaving or knitting, the artificial light-emitting fibers 21, 22 used to weave or knit the fabric inevitably curve successively in a wavy form.

The twenty-third embodiment also has the same advantages as those of the twentieth embodiment. Further, since this embodiment can make a weaving or knitting pattern of the artificial light-emitting fibers 21, 22 having a more accurate period, it has the additional advantage that the artistic aspect of the artificial light-emitting fabric can be improved.

Next explained is the twenty-fourth embodiment of the invention.

This embodiment is directed to a stress emission material composed of $SrAl_2O_4$:Eu, La and a complex material prepared by using the stress emission material.

This stress emission material can be manufactured according the following procedure by ordinary solid phase reaction, for example.

First, 0.98 mol of strontium carbonate ($SrCO_3$) of a special grade and 1.00 mol of alumina ($Al_2O_3$) are prepared, and 0.005 mol of Eu in form of europium oxide ($Eu_2O_3$) and 0.005 mol of La in form of lanthanum oxide ($La_2O_2$) are added. Further, 0.08 mol of boron oxide ($B_2O_3$) is added as a flux. Then, these compounds are mixed in a ball mill. After that, this mixed powder sequentially undergoes calcination in oxygen at 1400° C. and annealing for reduction in an $N_2$ atmosphere added with $H_2$ (4%) at 1200° C. In this manner, a sample was prepared.

Figure 24:
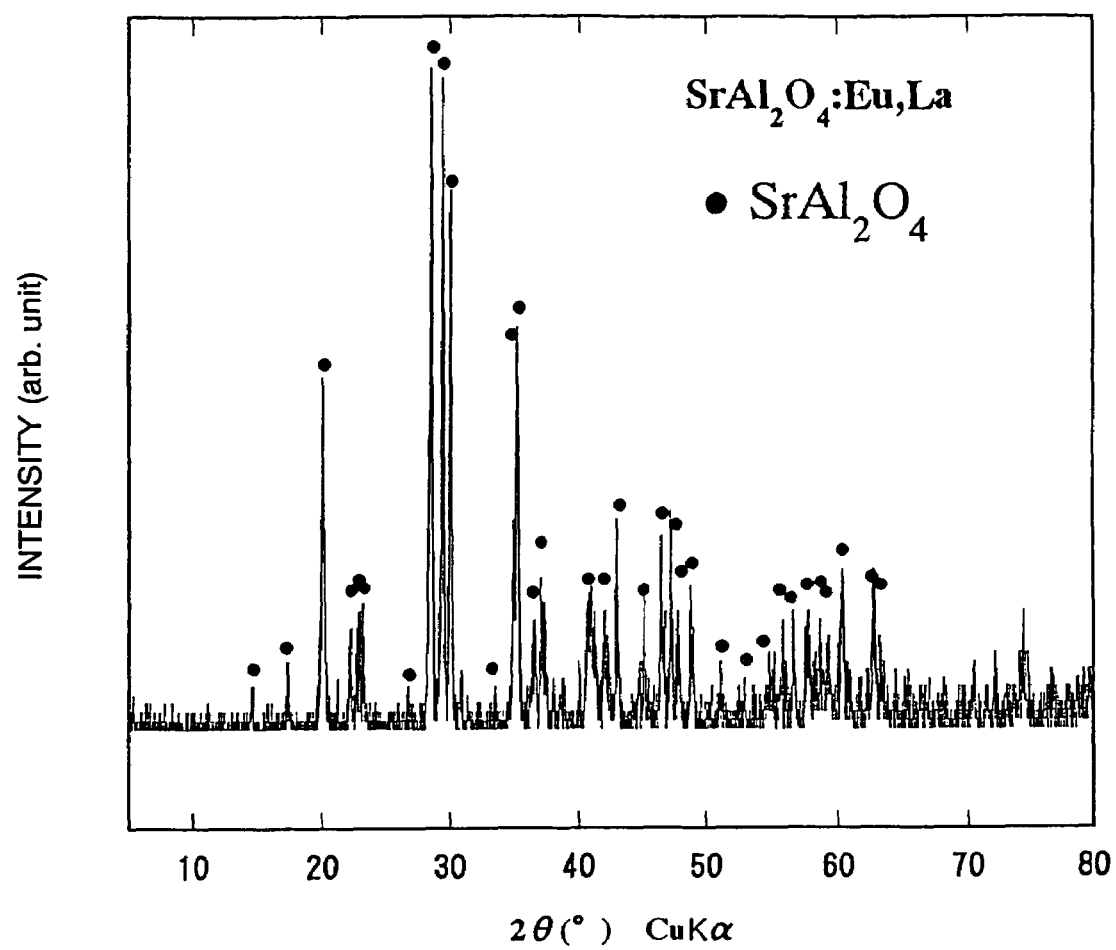
FIG. 24 is a diagram showing an X-ray diffraction pattern of a stress emission material prepared in the 24th embodiment of the invention.

FIG. 24 shows an X-ray diffraction pattern of the sample synthesized in this manner. It was confirmed from FIG. 24 that the obtained sample was entirely indexed by the monoclinic system similarly to a known article (F. Hanic, T. Y. Chemekova and J. Majling, F. Appl. Phys., 12 (1979) 243) and that the major component was composed of crystals similar to those of that article.

Figure 25:
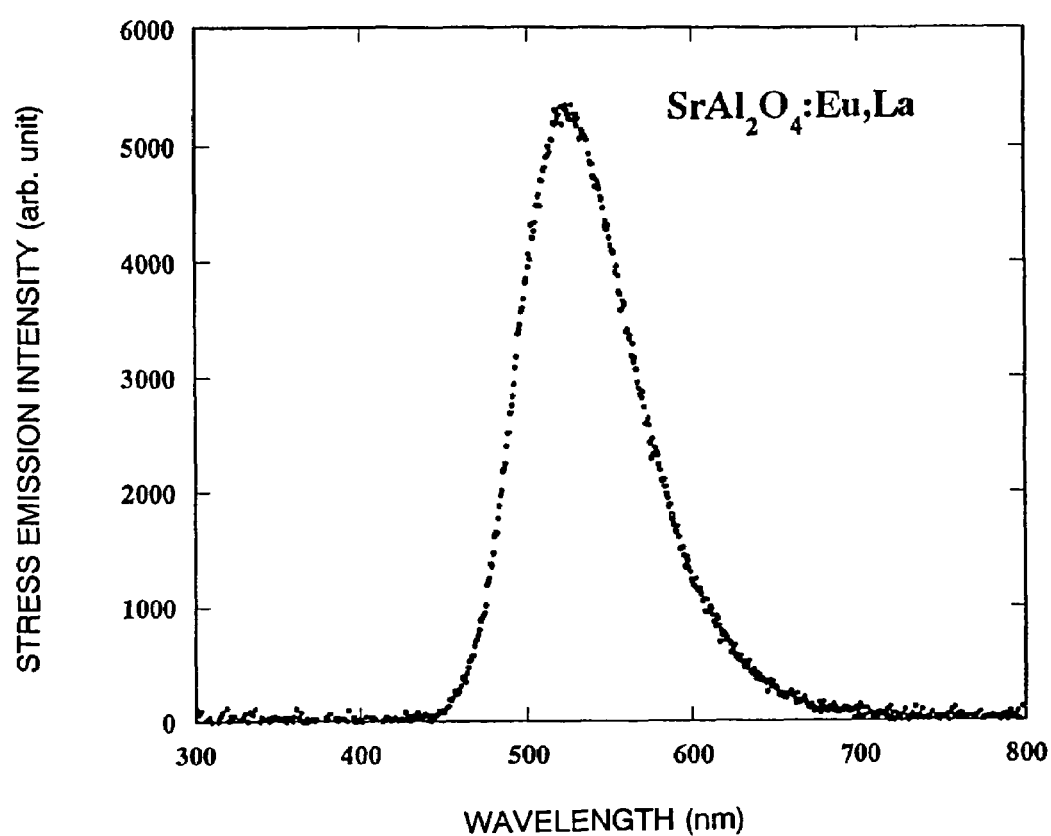
FIG. 25 is a schematic diagram showing stress emission spectrum of a stress emission material prepared in the 24th embodiment of the invention.

After that, epoxy resin and the powder of $SrAl_2O_4$:Eu, La are blended and mingled by the ratio of 1:1 in weight. The product was shaped in form of a sheet of several centimeters each side, and left for a whole day. As a result, an inorganic/organic complex sheet was obtained. This sheet was confirmed to be as thin as less than 1 mm (in form of an underlay) and gleam intensively in the dark when slightly bent. In the same manner, a cube of several mm each side was prepared by using a die. Then, a compressing load was applied to this sample from a load applying test machine made by the Inventors themselves to generate a stress. The light then generated was spectrally analyzed by a spectrometer, and stress emission spectrum appearing under the compression were measured. Its result is shown in FIG. 25. It will be appreciated from FIG. 25 that broad emission spectrum having the peak near the wavelength of 520 nm was obtained.

On the other hand, as a comparative example, a stress emission material made of $SrAl_2O_4$:Eu and a complex material composed of the stress emission material were prepared, and they were measured similarly. The stress emission material was prepared in the same manner as explained above, except that lanthanum oxide is not added to the source material.

Figure 26:
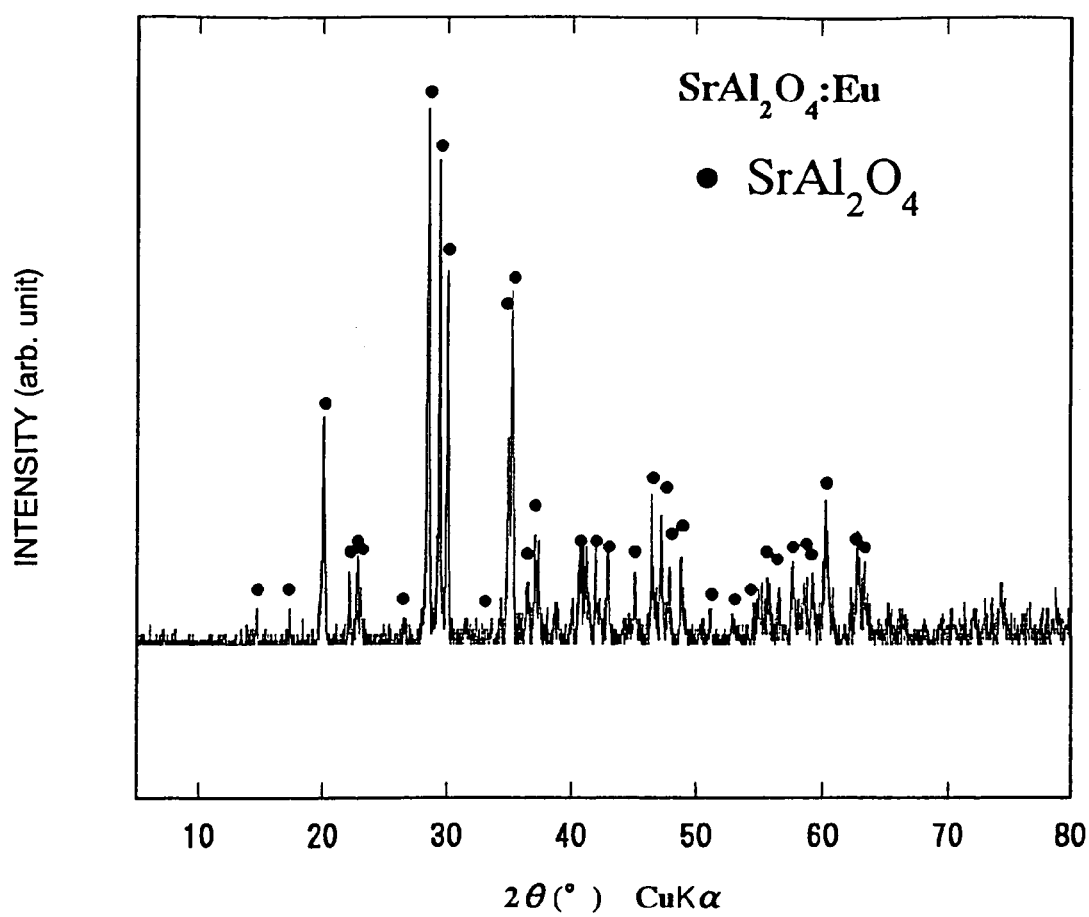
FIG. 26 is a diagram showing an X-ray diffraction pattern of a stress emission material prepared as a comparative example in the 24th embodiment of the invention.

FIG. 26 shows an X-ray diffraction pattern of the samples synthesized in this manner. It was confirmed from FIG. 26 that the obtained sample was entirely indexed by the monoclinic system similarly to the known article and that the major component was composed of crystals similar to those of that article.

Figure 27:
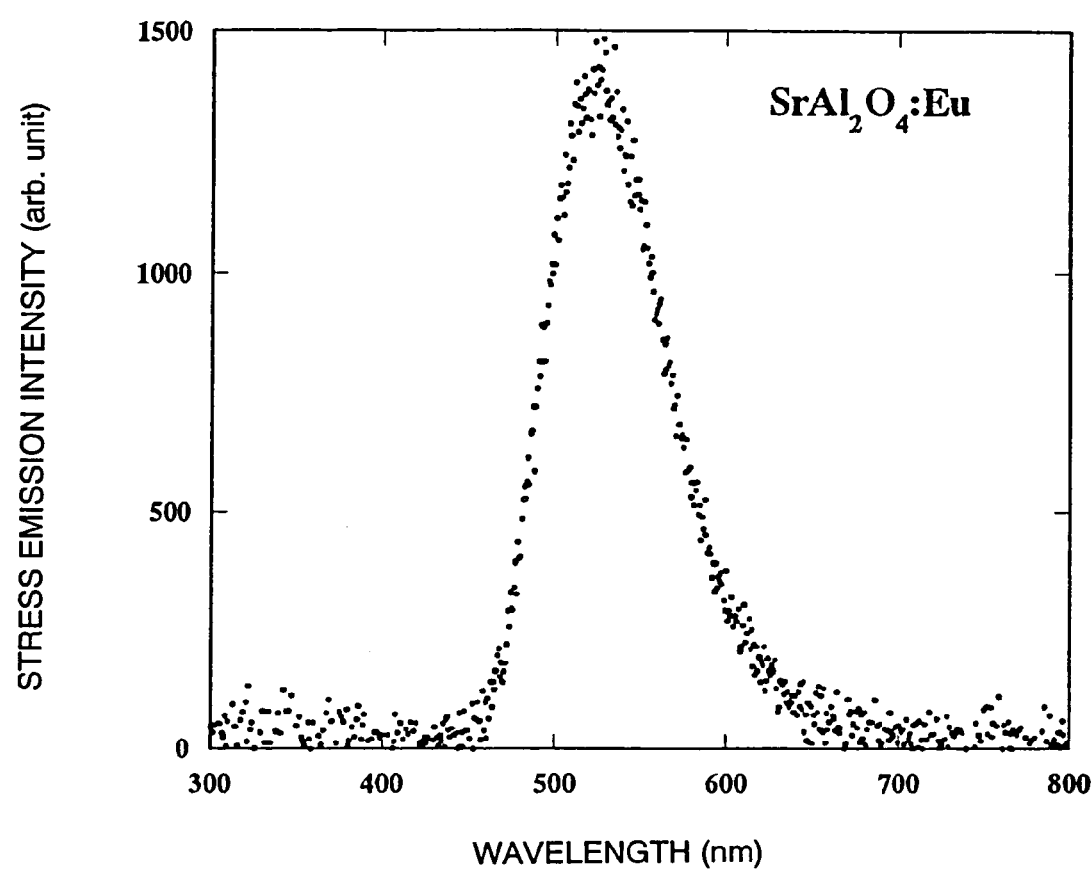
FIG. 27 is a schematic diagram showing stress emission spectrum of a stress emission material prepared as a comparative example in the 24th embodiment of the invention.

After that, powder of $SrAl_2O_4$:Eu and epoxy resin were complexed in the same manner, and an inorganic/organic complexed sheet material was prepared. Here again, the sheet was confirmed to be as thin as less than 1 mm and gleam intensively in the dark when slightly bent. In the same manner, a cube of several mm each side was prepared by using a die, and stress emission spectrum appearing under the compression was measured similarly. Its result is shown in FIG. 25. It will be appreciated from FIG. 27 that broad emission spectrum having the peak near the wavelength of 520 nm was obtained similarly to those already reported.

Figure 28:
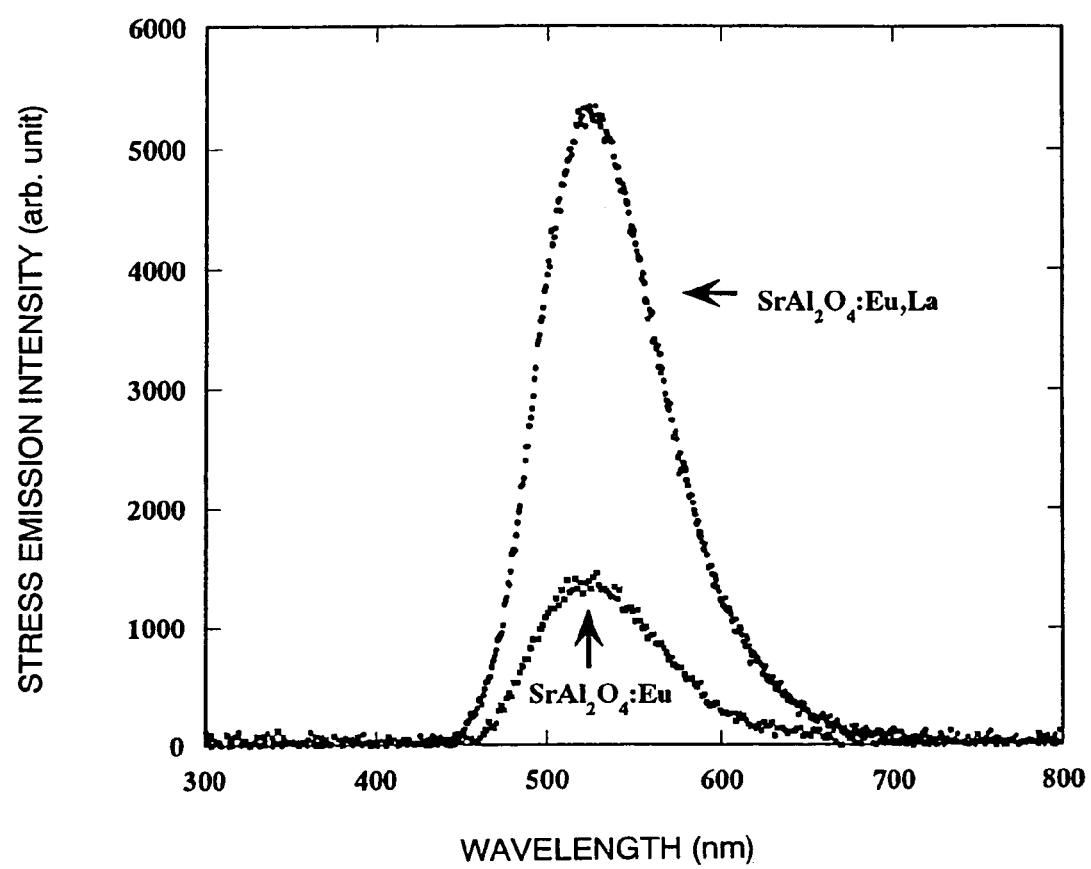
FIG. 28 is a schematic diagram showing stress emission spectrum of a stress emission material prepared in the 24th embodiment of the invention and a stress emission material prepared as a comparative example.
Figure 29:
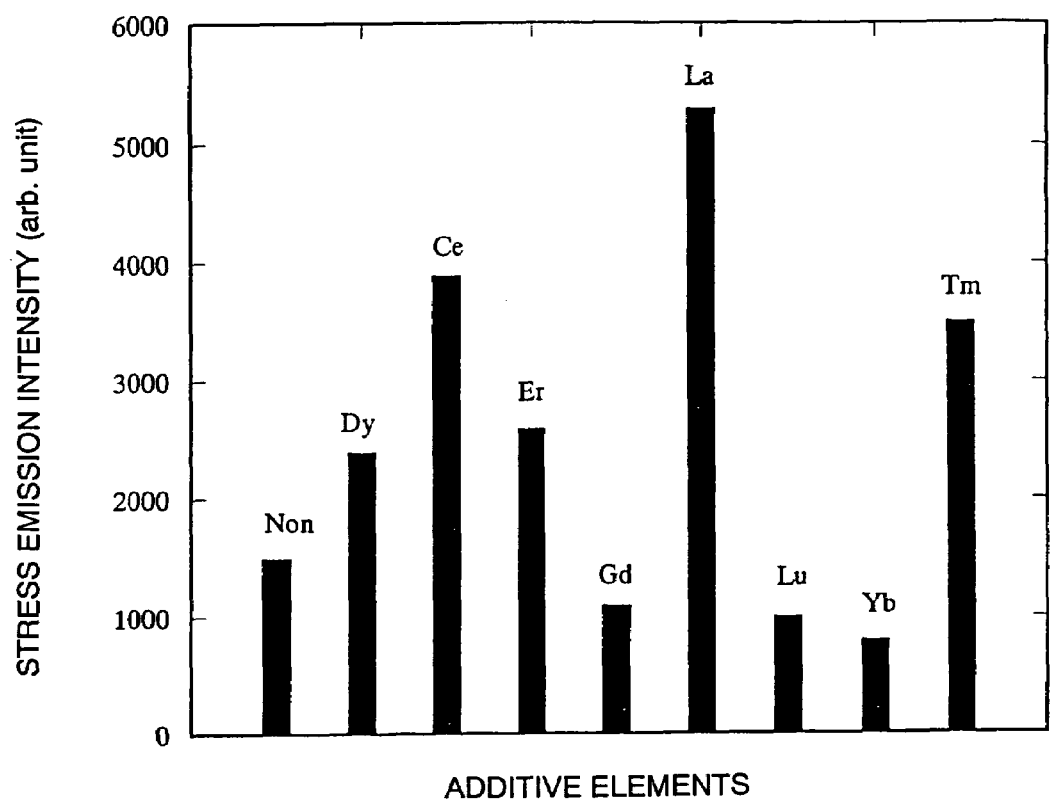
FIG. 29 is a schematic diagram showing emission intensities of emission peaks near the wavelength 520 nm in stress emission spectra of $SrAl_2O_4$ added with Eu alone and $SrAl_2O_4$ added with Dy, Ce, Er, Gd, La, Lu, Yb or Tm in addition to Eu.

FIG. 28 shows stress emission spectrum of the stress emission material according to the twenty-fourth embodiment and stress emission spectrum of the stress emission material as the comparative example in combination. It is apparent from FIG. 28 that the stress emission intensity of the stress emission material according to the twenty-fourth embodiment is clearly higher than that of the stress emission material as the comparative example. The emission peak near the wavelength of 520 nm is more than three times. FIG. 29 shows emission intensities of the emission peak near the wavelength of 520 nm of the material prepared by adding only Eu to $SrAl_2O_4$ and the material prepared by adding Eu and La, Ce, Er, Tm, Gd, Lu, Yb or Dy to $SrAl_2O_4$.

As explained above, according to the twenty-fourth embodiment, it is possible to obtain $SrAl_2O_4$:Eu, La as a novel stress emission material whose emission intensity is more than three times that of $SrAl_2O_4$:Eu that is a conventional stress emission material. Since the stress emission intensity is much higher than that of the conventional stress emission material, Furthermore, if this stress emission material is complexed with a resin, for example, then a user can easily induce emission of light only by lightly touching it with his/her hand, for example. Moreover, it is possible to permit emission only when applying a stress by touching it, for example.

Next explained is the twenty-fifth embodiment of the invention.

This embodiment is directed to a stress emission material composed of $SrAl_2O_4$:Eu, Ce and a complex material made of the stress emission material.

The stress emission material of this embodiment can be prepared in the same manner as the twenty-fourth embodiment except that cerium oxide ($Ce_2O_3$) is added as a Ce source instead of a La source.

An X-ray diffraction pattern of the synthesized sample was measured, and it was confirmed that the sample was entirely indexed by the monoclinic system similarly to the known article and that the major component was composed of crystals similar to those of that article.

Similarly to the twenty-fourth embodiment, powder of $SrAl_2O_4$:Eu, Ce was next complexed with epoxy resin, and an inorganic/organic complex sheet material was prepared. This sheet was also confirmed to be as thin as less than 1 mm gleam intensively in the dark when slightly bent. In the same manner, a cube of several mm each side was prepared by using a die, and stress emission spectrum appearing under compression was measured similarly to the twenty-fourth embodiment. As a result, broad emission spectrum having a peak near the wavelength of 520 nm was confirmed. Emission intensity of the emission peak near the wavelength 520 nm was two times or more as compared with that of the sample using $SrAl_2O_4$:Eu (FIG. 29).

According to the twenty-fifth embodiment, it is possible to obtain $SrAl_2O_4$:Eu, Ce as a novel stress emission material whose emission intensity is much higher by more than two times of the emission intensity of $SrAl_2O_4$:Eu that is a conventional stress emission material, and it is possible to ensure the same advantages as those of the twenty-fourth embodiment.

Next explained is the twenty-sixth embodiment of the invention.

This embodiment is directed to a stress emission material composed of $SrAl_2O_4$:Eu, Tm and a complex material made of the stress emission material.

The stress emission material of this embodiment can be prepared in the same manner as the twenty-fourth embodiment except that thulium oxide ($Tm_2O_3$) is added as a Tm source instead of a La source.

An X-ray diffraction pattern of the synthesized sample was measured, and it was confirmed that the sample was entirely indexed by the monoclinic system similarly to the known article and that the major component was composed of crystals similar to those of that article.

Similarly to the twenty-fourth embodiment, powder of $SrAl_2O_4$:Eu, Tm was next complexed with epoxy resin, and an inorganic/organic complex sheet material was prepared. This sheet was also confirmed to be as thin as less than 1 mm and gleam intensively in the dark when slightly bent. In the same manner, a cube of several mm each side was prepared by using a die, and stress emission spectrum appearing under compression was measured similarly to the twenty-fourth embodiment. As a result, broad emission spectrum having a peak near the wavelength of 520 nm was confirmed. Emission intensity of the emission peak near the wavelength 520 nm was two times or more as compared with that of the sample using $SrAl_2O_4$:Eu (FIG. 29).

According to the twenty-sixth embodiment, it is possible to obtain $SrAl_2O_4$:Eu, Tm as a novel stress emission material whose emission intensity is much higher by more than two times of the emission intensity of $SrAl_2O_4$:Eu that is a conventional stress emission material, and it is possible to ensure the same advantages as those of the twenty-fourth embodiment.

Next explained is the twenty-seventh embodiment of the invention.

This embodiment is directed to a stress emission material composed of $SrAl_2O_4$:Eu, Er and a complex material made of the stress emission material.

The stress emission material of this embodiment can be prepared in the same manner as the twenty-fourth embodiment except that erbium oxide ($Er_2O_3$) is added as an Er source instead of a La source.

An X-ray diffraction pattern of the synthesized sample was measured, and it was confirmed that the sample was entirely indexed by the monoclinic system similarly to the known article and that the major component was composed of crystals similar to those of that article.

Similarly to the twenty-fourth embodiment, powder of $SrAl_2O_4$:Eu, Er was next complexed with epoxy resin, and an inorganic/organic complex sheet material was prepared. This sheet was also confirmed to be as thin as less than 1 mm and gleam intensively in the dark when slightly bent. In the same manner, a cube of several mm each side was prepared by using a die, and stress emission spectrum appearing under compression was measured similarly to the twenty-fourth embodiment. As a result, broad emission spectrum having a peak near the wavelength of 520 nm was confirmed. Emission intensity of the emission peak near the wavelength 520 nm was two times or more as compared with that of the sample using $SrAl_2O_4$:Eu (FIG. 29).

According to the twenty-seventh embodiment, it is possible to obtain $SrAl_2O_4$:Eu, Er as a novel stress emission material whose emission intensity is much higher by more than two times of the emission intensity of $SrAl_2O_4$:Eu that is a conventional stress emission material, and it is possible to ensure the same advantages as those of the twenty-fourth embodiment.

Next explained is the twenty-eighth embodiment of the invention.

This embodiment is directed to a stress emission material composed of $SrAl_2O_4$:Eu, Gd and a complex material made of the stress emission material.

The stress emission material of this embodiment can be prepared in the same manner as the twenty-fourth embodiment except that gadolinium oxide ($Gd_2O_3$) is added as a Gd source instead of a La source.

An X-ray diffraction pattern of the synthesized sample was measured, and it was confirmed that the sample was entirely indexed by the monoclinic system similarly to the known article and that the major component was composed of crystals similar to those of that article.

Similarly to the twenty-fourth embodiment, powder of $SrAl_2O_4$:Eu, Gd was next complexed with epoxy resin, and an inorganic/organic complex sheet material was prepared. This sheet was also confirmed to be as thin as less than 1 mm and gleam intensively in the dark when slightly bent. In the same manner, a cube of several mm each side was prepared by using a die, and stress emission spectrum appearing under compression was measured similarly to the twenty-fourth embodiment. As a result, broad emission spectrum having a peak near the wavelength of 520 nm was confirmed. Emission intensity of the emission peak near the wavelength 520 nm was as shown in FIG. 29.

According to the twenty-eighth embodiment, it is possible to obtain $SrAl_2O_4$:Eu, Gd as a novel stress emission material.

Next explained is the twenty-ninth embodiment of the invention.

This embodiment is directed to a stress emission material composed of $SrAl_2O_4$:Eu, Lu and a complex material made of the stress emission material.

The stress emission material of this embodiment can be prepared in the same manner as the twenty-fourth embodiment except that lutetium oxide ($Lu_2O_3$) is added as a Lu source instead of a La source.

An X-ray diffraction pattern of the synthesized sample was measured, and it was confirmed that the sample was entirely indexed by the monoclinic system similarly to the known article and that the major component was composed of crystals similar to those of that article.

Similarly to the twenty-fourth embodiment, powder of $SrAl_2O_4$:Eu, Lu was next complexed with epoxy resin, and an inorganic/organic complex sheet material was prepared. This sheet was also confirmed to be as thin as less than 1 mm and gleam intensively in the dark when slightly bent. In the same manner, a cube of several mm each side was prepared by using a die, and stress emission spectrum appearing under compression was measured similarly to the twenty-fourth embodiment. As a result, broad emission spectrum having a peak near the wavelength of 520 nm was confirmed. Emission intensity of the emission peak near the wavelength 520 nm was as shown in FIG. 29.

According to the twenty-ninth embodiment, it is possible to obtain $SrAl_2O_4$:Eu, Lu as a novel stress emission material.

Next explained is the thirtieth embodiment of the invention.

This embodiment is directed to a stress emission material composed of $SrAl_2O_4$:Eu, Yb and a complex material made of the stress emission material.

The stress emission material of this embodiment can be prepared in the same manner as the twenty-fourth embodiment except that ytterbium oxide ($Yb_2O_3$) is added as a source of Yb instead of a source of La.

An X-ray diffraction pattern of the synthesized sample was measured, and it was confirmed that the sample was entirely indexed by the monoclinic system similarly to the known article and that the major component was composed of crystals similar to those of that article.

Similarly to the twenty-fourth embodiment, powder of $SrAl_2O_4$:Eu, Yb was next complexed with epoxy resin, and an inorganic/organic complex sheet material was prepared. This sheet was also confirmed to be as thin as less than 1 mm and gleam intensively in the dark when slightly bent. In the same manner, a cube of several mm each side was prepared by using a die, and stress emission spectrum appearing under compression was measured similarly to the twenty-fourth embodiment. As a result, broad emission spectrum having a peak near the wavelength of 520 nm was confirmed. Emission intensity of the emission peak near the wavelength 520 nm was as shown in FIG. 29.

According to the thirtieth embodiment, it is possible to obtain $SrAl_2O_4$:Eu, Yb as a novel stress emission material.

Having described specific preferred embodiments of the present invention with reference to the accompanying drawings, it is to be understood that the invention is not limited to those precise embodiments, and that various changes and modifications may be effected therein by one skilled in the art without departing from the scope or the spirit of the invention as defined in the appended claims.

For example, numerical values, structures, shapes, materials, source materials, processes, and others are not but examples. Other acceptable numerical values, structures, shapes, materials, source materials and processes may be employed alternatively.

As described above, according to the present invention, since the grain size of crystalline superfine particles capable of emitting light depending upon the time-rate-of-change of a stress is controlled in the range from 5 nm to 100 nm, it is possible to prepare a transparent light-emitting material excellent in dispersibility when complexed with the other material and enhanced in emission efficiency, Furthermore, by using the inverted micelle method, it is possible to manufacture crystalline superfine particles, inverted micelles, inverted micelles enveloping precursor superfine particles, inverted micelles enveloping crystalline superfine particles, and precursor superfine particles in an easy manner, and it is possible to manufacture a complex material containing crystalline superfine particles dispersed therein in an easy manner.

Moreover, the invention can realize a transparent stress emission material by using a transparent substance as the material to be complexed.

If an elastic material is used as the material to be complexed, it is possible to realize a complex material with which a person can induce emission of light by applying his/her force, such as a hand or finger touch, and can permit it to emit light only when stressed by a tough, for example. In addition, from this complex material, it is possible to manufacture artificial light-emitting hair and artificial light-emitting fibers, and from these products, it is possible to realize artificial light-emitting hair structures, artificial light-emitting skin, artificial light-emitting bodies, artificial light-emitting fabrics, and so forth. These novel products will bring about a revolution in the field of robots for entertainment or amusement purposes and the field of optics, for example.

What is claimed is:

1. A method of manufacturing a crystalline superfine particle which emits light depending upon the time-rate-of-change of a stress applied thereto, comprising:
   dissolving metal ions of a metal for forming the crystalline superfine particle in water to form an aqueous phase;
   stably dispersing the aqueous phase with a surfactant in oil to form a molecular aggregate in which hydrophilic groups of surfactant molecules orient inward and hydrophobic groups thereof outward in a nonpolar solvent thus encapsulating said metal ions of a metal for forming the crystalline superfine particle inside an inverted micelle;

conducting a hydrolytic or precipitation reaction to form superfine particles; and crystallizing the superfine particles to form crystalline superfine particles which emit light depending upon the time-rate-of-change of a stress applied thereto, wherein the crystalline superfine particles have a composition expressed by the general formula $A_xB_yO_z$ where $0.8 \leq x \leq 1.1$ $1.8 \leq y \leq 2.2$ $\{(2x+3y)/2\}-0.2 < z < \{2x+3y)/2\}+0.2$ $A=Sr_kBa_lCa_mMg_n$ ($0 \leq k, l, m, n \leq 1$, $k+l+m+n=1$)

$B=Al_{1-p}D_p$ ($0 \leq p < 1$)

$D=Y_qGa_rIn_t$ ($0 \leq q, r, t \leq 1$, $q+r+t=1$), wherein the metal ions in the water contained in the molecular aggregate are ions of alkaline earth metal used as the component A and ions of a metal used as the component B in the general formula, wherein the ratio of the ions of the alkaline earth metal as the component A relative to the ions of the metal as the component B is in the range from 0.1 to 0.5, and wherein the crystalline superfine particles has a grain size in the range from 5 nm to 100 nm.

2. The method according to claim 1 wherein concentration of the metal ions relative to the water contained in the molecular aggregate is 10 mol/l or less.

3. The method according to claim 1 wherein the water contained in the molecular aggregate contains 0.2 mol or less in total of a rare earth element or a transition metal element relative to 1 mol of ions of the alkaline earth metal as the component A in the general formula.

4. The method according to claim 3 wherein at least Eu is contained as the rare earth element or the transition metal element.

5. A method of manufacturing a precursor superfine particle of crystalline superfine particle which emits light depending upon the time-rate-of-change of a stress applied thereto, comprising:

dissolving metal ions of a metal for forming a precursor superfine particle of the crystalline superfine particle in water to form an aqueous phase;

stably dispersing the aqueous phase with a surfactant in oil to form molecular aggregate in which hydrophilic groups of surfactant molecules orient inward and hydrophobic groups thereof outward in a nonpolar solvent thus encapsulating said metal ions of a metal for forming the crystalline superfine particle inside an inverted micelle; and conducting a hydrolytic or precipitation reaction to form precursor superfine particles of the crystalline superfine particle, wherein the precursor superfine particles of the crystalline superfine particle has a composition expressed by the general formula $A_xB_yO_z$ where $0.8 \leq x \leq 1.1$ $1.8 \leq y \leq 2.2$ $\{(2x+3y)/2\}-0.2 < z < \{2x+3y)/2\}+0.2$ $A=Sr_kBa_lCa_mMg_n$ ($0 \leq k, l, m, n \leq 1$, $k+l+m+n=1$)

$B=Al_{1-p}D_p$ ($0 \leq p < 1$)

$D=Y_qGa_rIn_t$ ($0 \leq q, r, t \leq 1$, $q+r+t=1$), wherein the metal ions in the water contained in the molecular aggregate are ions of alkaline earth metal used as the component A and ions of a metal used as the component B in the general formula, and wherein the ratio of the ions of the alkaline earth metal as the component A relative to the ions of the metal as the component B is in the range from 0.1 to 0.5.

6. The method according to claim 5 wherein the crystalline superfine particles has a grain size in the range from 5 nm to 100 nm.

7. A method of manufacturing a crystalline superfine particle which emits light depending upon the time-rate-of-change of a stress applied thereto, comprising:

forming a substance in which the crystalline superfine particle is contained in water which is contained in a molecular aggregate orienting hydrophilic groups of surfactant molecules inward and hydrophobic groups thereof outward in a nonpolar solvents, wherein the crystalline superfine particle has a composition expressed by the general formula $A_xB_yO_z$ where $0.8 \leq x \leq 1.1$ $1.8 \leq y \leq 2.2$ $\{(2x+3y)/2\}-0.2 < z < \{2x+3y)/2\}+0.2$ $A=Sr_kBa_lCa_mMg_n$ ($0 \leq k, l, m, n \leq 1$, $k+l+m+n=1$)

$B=Al_{1-p}D_p$ ($0 \leq p < 1$)

$D=Y_qGa_rIn_t$ ($0 \leq q, r, t \leq 1$, $q+r+t=1$), wherein the metal ions in the water contained in the molecular aggregate are ions of alkaline earth metal used as the component A and ions of a metal used as the component B in the general formula, wherein the ratio of the ions of the alkaline earth metal as the component A relative to the ions of the metal as the component B is in the range from 0.1 to 0.5, and wherein the crystalline superfine particles has a grain size in the range from 5 nm to 100 nm.

8. The method according to claim 1 wherein said crystallizing is a method selected from the group consisting of annealing, laser irradiation, ultrasonic wave irradiation, and microwave irradiation.

* * * * *

UNITED STATES PATENT AND TRADEMARK OFFICE
CERTIFICATE OF CORRECTION

PATENT NO. : 7,306,751 B2 Page 1 of 1
APPLICATION NO. : 11/490069
DATED : December 11, 2007
INVENTOR(S) : Hiroki Naito et al.

It is certified that error appears in the above-identified patent and that said Letters Patent is hereby corrected as shown below:

Column 34, line 45 Change "tough" to --touch--

Signed and Sealed this

Twenty-ninth Day of July, 2008

JON W. DUDAS
*Director of the United States Patent and Trademark Office*